(12) United States Patent
Peterson et al.

(10) Patent No.: US 7,341,353 B2
(45) Date of Patent: Mar. 11, 2008

(54) VARIABLE FRESNEL SCREEN FOR USE IN PROJECTION DEVICE

(75) Inventors: Mark D. Peterson, Lake Oswego, OR (US); David Glaess, West Linn, OR (US); Jeffrey Alan Gohman, Hillsboro, OR (US)

(73) Assignee: InFocus Corporation, Wilsonville, OR (US)

( * ) Notice: Subject to any disclaimer, the term of this patent is extended or adjusted under 35 U.S.C. 154(b) by 739 days.

(21) Appl. No.: 10/753,755

(22) Filed: Jan. 6, 2004

(65) Prior Publication Data

US 2004/0227990 A1 Nov. 18, 2004

Related U.S. Application Data

(63) Continuation-in-part of application No. 10/222,083, filed on Aug. 16, 2002, now Pat. No. 6,896,375, and a continuation-in-part of application No. 10/222,050, filed on Aug. 16, 2002, now Pat. No. 7,009,765.

(51) Int. Cl.
*G03B 21/14* (2006.01)
*G03B 21/16* (2006.01)
*G03B 21/18* (2006.01)
*G03B 21/56* (2006.01)
*G03B 21/60* (2006.01)

(52) U.S. Cl. .................. 353/52; 57/69; 57/77; 57/78; 57/102; 359/457; 359/459; 359/460

(58) Field of Classification Search ............... 359/457, 359/459, 460; 353/69, 70, 77–79, 100–102, 353/101, 52, 57, 98; 348/744
See application file for complete search history.

(56) References Cited

U.S. PATENT DOCUMENTS

| | | | |
|---|---|---|---|
| 3,485,165 A | 12/1969 | Hughes | |
| 3,712,707 A | 1/1973 | Henkes, Jr. | |
| 4,674,836 A | 6/1987 | Yata et al. | |
| 4,729,631 A | 3/1988 | Takahashi et al. | |
| 4,730,897 A | 3/1988 | McKechnie et al. | |
| 4,773,731 A | 9/1988 | Goldenberg et al. | |

(Continued)

FOREIGN PATENT DOCUMENTS

JP 2989947 5/1993

OTHER PUBLICATIONS

H. Kanayama et al., "A New LC Rear-Projection Display Based on the Aspherical Mirror Projection System," IDW, 2000, pp. 1041-1044, Sanyo Electric Co., Ltd., Osaka Japan.

(Continued)

*Primary Examiner*—Melissa Jan Koval
(74) *Attorney, Agent, or Firm*—Alleman Hall McCoy Russell & Tuttle LLP

(57) ABSTRACT

A thin rear projection television using a wide angle lens system is provided. In an embodiment, a fresnel screen is used in which there are at least two spatial zones in the screen with different properties. The at least two zones may be adapted to compensate for the variation in input angle.

42 Claims, 15 Drawing Sheets

U.S. PATENT DOCUMENTS

| | | | |
|---|---|---|---|
| 4,880,292 | A | 11/1989 | Kageyama et al. |
| 4,921,330 | A | 5/1990 | Takahashi et al. |
| 4,927,248 | A | 5/1990 | Sakakibara et al. |
| 4,936,657 | A | 6/1990 | Tejima et al. |
| 4,979,801 | A | 12/1990 | Park |
| RE33,795 | E | 1/1992 | Ogino |
| 5,100,222 | A | 3/1992 | Minoura et al. |
| 5,302,983 | A | 4/1994 | Sato et al. |
| 5,422,691 | A | 6/1995 | Ninomiya et al. |
| 5,442,413 | A | 8/1995 | Tejima et al. |
| 5,442,484 | A | 8/1995 | Shikawa |
| 5,489,940 | A | 2/1996 | Richardson et al. |
| 5,495,306 | A | 2/1996 | Shibazaki |
| 5,699,131 | A | 12/1997 | Aoki et al. |
| 5,710,668 | A | 1/1998 | Gohman et al. |
| 5,716,118 | A | 2/1998 | Sato et al. |
| 5,724,195 | A | 3/1998 | Enomoto et al. |
| 5,760,973 | A | 6/1998 | Kawamura |
| 5,796,528 | A | 8/1998 | Mihara |
| 5,805,359 | A | 9/1998 | Yamanashi |
| 5,818,639 | A | 10/1998 | Furuya |
| 5,820,240 | A | 10/1998 | Ohzawa |
| 5,833,339 | A | 11/1998 | Sarayeddine |
| 5,870,234 | A | 2/1999 | Ebbesmeier nee Schitthof |
| 5,923,479 | A | 7/1999 | Nagata |
| 5,987,051 | A | 11/1999 | Peters |
| 5,999,332 | A | 12/1999 | Ohno |
| 6,016,229 | A | 1/2000 | Suzuki |
| 6,018,425 | A | 1/2000 | Nakabayashi et al. |
| 6,038,085 | A | 3/2000 | Nakazawa |
| 6,046,859 | A | 4/2000 | Raj |
| 6,052,226 | A | 4/2000 | Takahashi |
| 6,053,615 | A | 4/2000 | Peterson et al. |
| 6,081,380 | A | 6/2000 | Ohshima et al. |
| 6,084,707 | A | 7/2000 | Maruyama et al. |
| 6,088,172 | A | 7/2000 | Sato |
| 6,111,701 | A | 8/2000 | Brown |
| 6,123,425 | A | 9/2000 | Ohzawa |
| 6,129,552 | A | 10/2000 | Deshoux et al. |
| 6,137,638 | A | 10/2000 | Yamagishi et al. |
| 6,144,503 | A | 11/2000 | Sugano |
| 6,147,812 | A | 11/2000 | Narimatsu et al. |
| 6,188,523 | B1 | 2/2001 | Choi |
| 6,201,647 | B1 | 3/2001 | Ohzawa |
| 6,236,511 | B1 | 5/2001 | Brown |
| 6,273,338 | B1 | 8/2001 | White |
| 6,299,313 | B1 | 10/2001 | Hirata et al. |
| 6,301,058 | B2 | 10/2001 | Nagahara |
| 6,307,675 | B1 | 10/2001 | Abe et al. |
| 6,348,993 | B1 | 2/2002 | Hori |
| 6,353,509 | B1 | 3/2002 | Nakazawa |
| 6,366,400 | B1 | 4/2002 | Ohzawa |
| 6,384,987 | B1 | 5/2002 | Sensui |
| 6,396,641 | B2 | 5/2002 | Hirata et al. |
| 6,400,504 | B2 | 6/2002 | Miyata |
| 6,406,150 | B1 | 6/2002 | Burstyn |
| 6,407,859 | B1 | 6/2002 | Hennen et al. |
| 6,407,860 | B1 | 6/2002 | Funazaki et al. |
| 6,416,181 | B1 | 7/2002 | Kessler et al. |
| 6,417,966 | B1 | 7/2002 | Moshrefzadeh et al. |
| 6,419,365 | B1 | 7/2002 | Potekev et al. |
| 6,471,359 | B1 | 10/2002 | Kim et al. |
| 6,473,236 | B2 | 10/2002 | Tadic-Galeb et al. |
| 6,485,145 | B1 | 11/2002 | Cotton et al. |
| 6,493,032 | B1 | 12/2002 | Wallerstein et al. |
| 6,513,935 | B2 | 2/2003 | Ogawa |
| 6,561,649 | B1 | 5/2003 | Burstyn |
| 6,574,041 | B1 * | 6/2003 | Chen ................. 359/459 |
| 6,624,952 | B2 | 9/2003 | Kuwa et al. |
| 6,626,541 | B2 | 9/2003 | Sunaga |
| 6,652,104 | B2 | 11/2003 | Nishida et al. |
| 6,752,500 | B1 | 6/2004 | Tateishi et al. |
| 6,768,594 | B2 | 7/2004 | Imafuku et al. |
| 6,788,460 | B2 | 9/2004 | Knox et al. |
| 6,804,055 | B2 | 10/2004 | Peterson et al. |
| 6,808,271 | B1 | 10/2004 | Kurematsu |
| 6,813,094 | B2 | 11/2004 | Kaminsky et al. |
| 6,853,493 | B2 | 2/2005 | Kreitzer |
| 6,877,862 | B2 | 4/2005 | Fukunaga et al. |
| 6,880,934 | B2 | 4/2005 | Lee |
| 6,883,920 | B2 | 4/2005 | Chen |
| 2002/0008853 | A1 | 1/2002 | Sunaga |
| 2002/0044263 | A1 | 4/2002 | Takeuchi |
| 2003/0025885 | A1 | 2/2003 | Cotton et al. |
| 2003/0038999 | A1 | 2/2003 | Knox et al. |
| 2003/0053206 | A1 | 3/2003 | Togino |
| 2003/0169513 | A1 | 9/2003 | Kaminsky et al. |
| 2003/0231261 | A1 | 12/2003 | Bassi et al. |
| 2004/0001254 | A1 | 1/2004 | Shimizu |
| 2004/0227990 | A1 | 11/2004 | Peterson et al. |
| 2004/0257539 | A1 * | 12/2004 | Peterson et al. ............... 353/69 |

OTHER PUBLICATIONS

J. Ouellette, "Digital Displays with Micromirror Devices," American Institute of Physics, Jun. 1997, pp. 9-11.

J. Shinozaki, et al. "15.3: A 50-in. Ultra-Slim Liquid-Crystal Rear Projector," SID 92 Digest, 1992, pp. 273-276, Seiko Epson Corp., Tokyo, Japan.

* cited by examiner

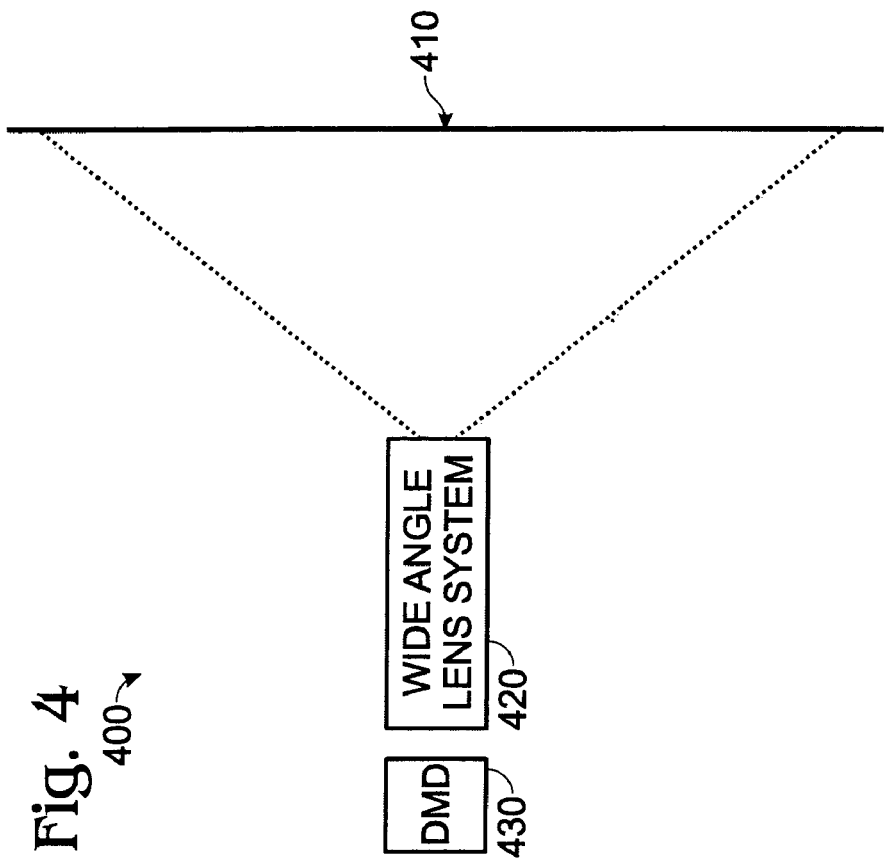
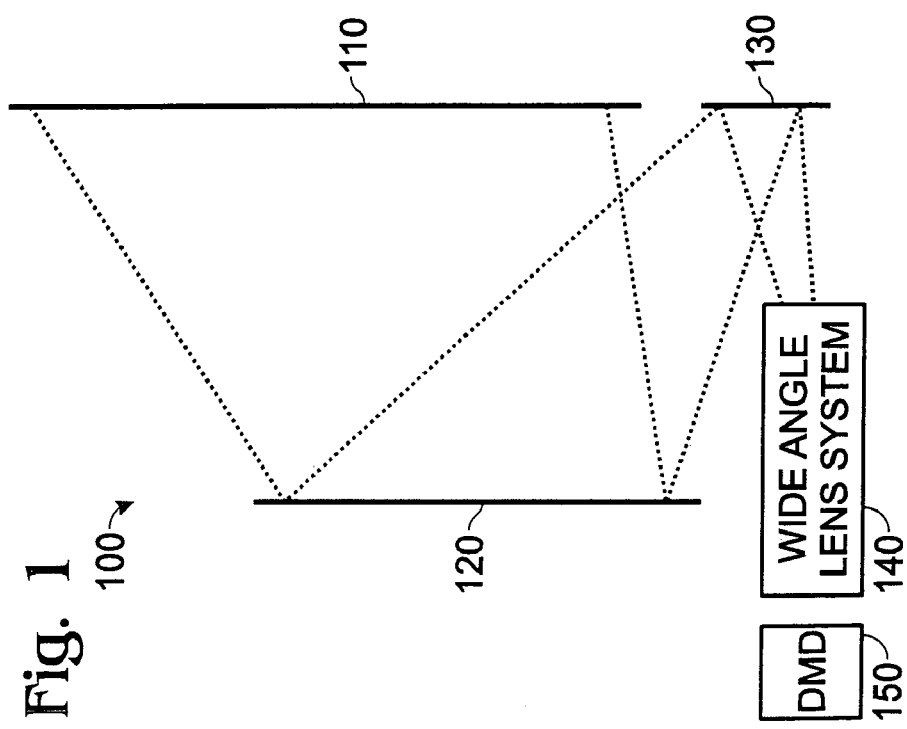

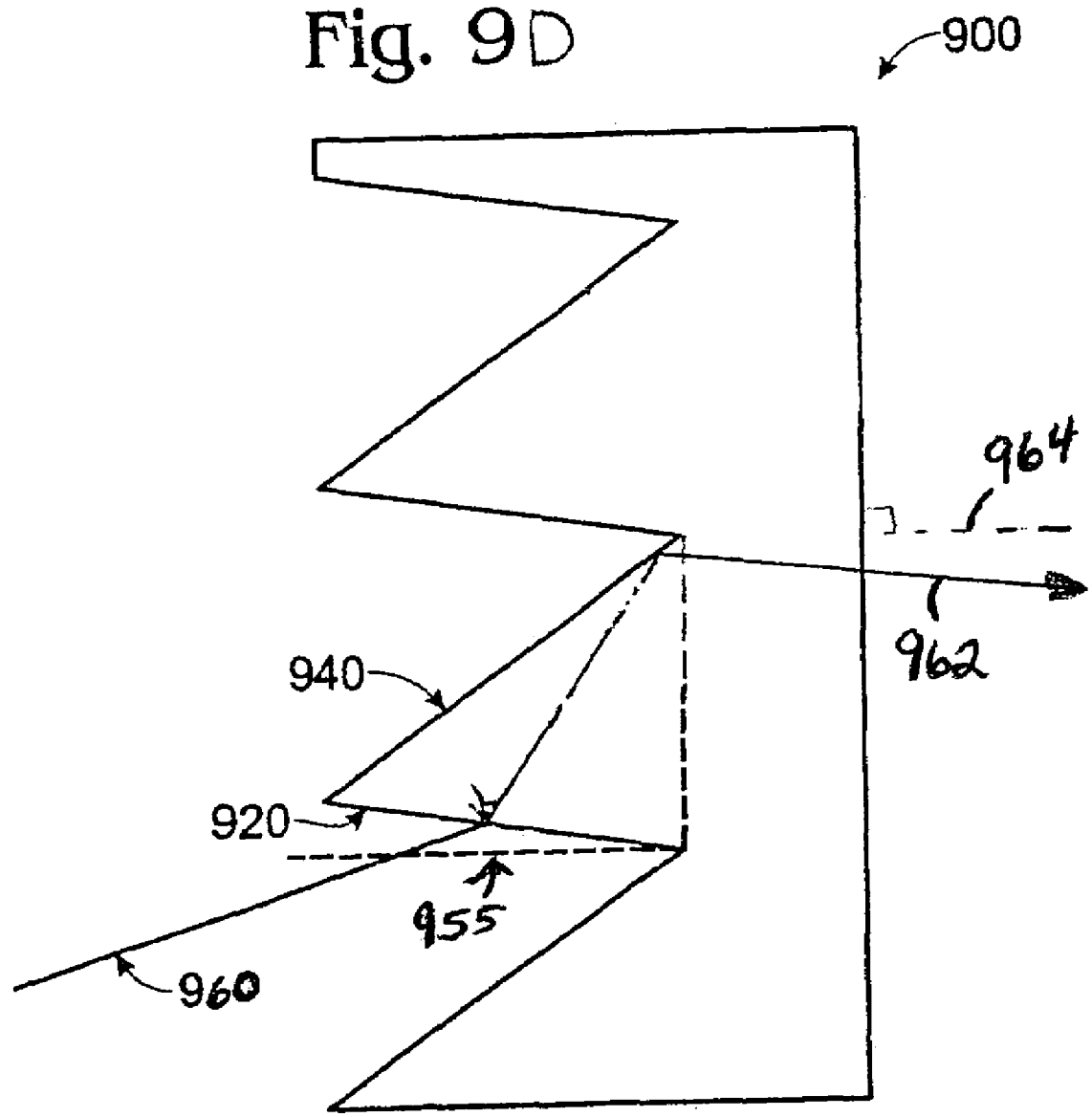

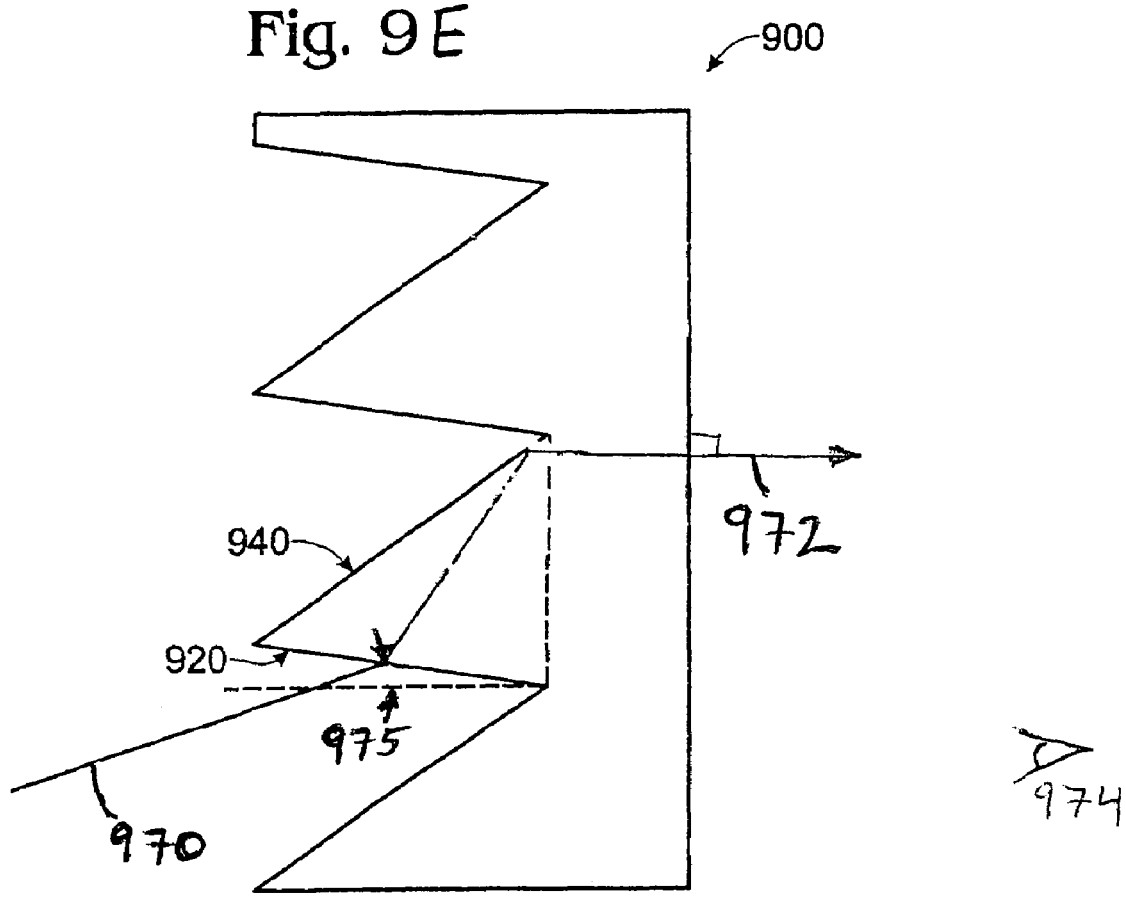

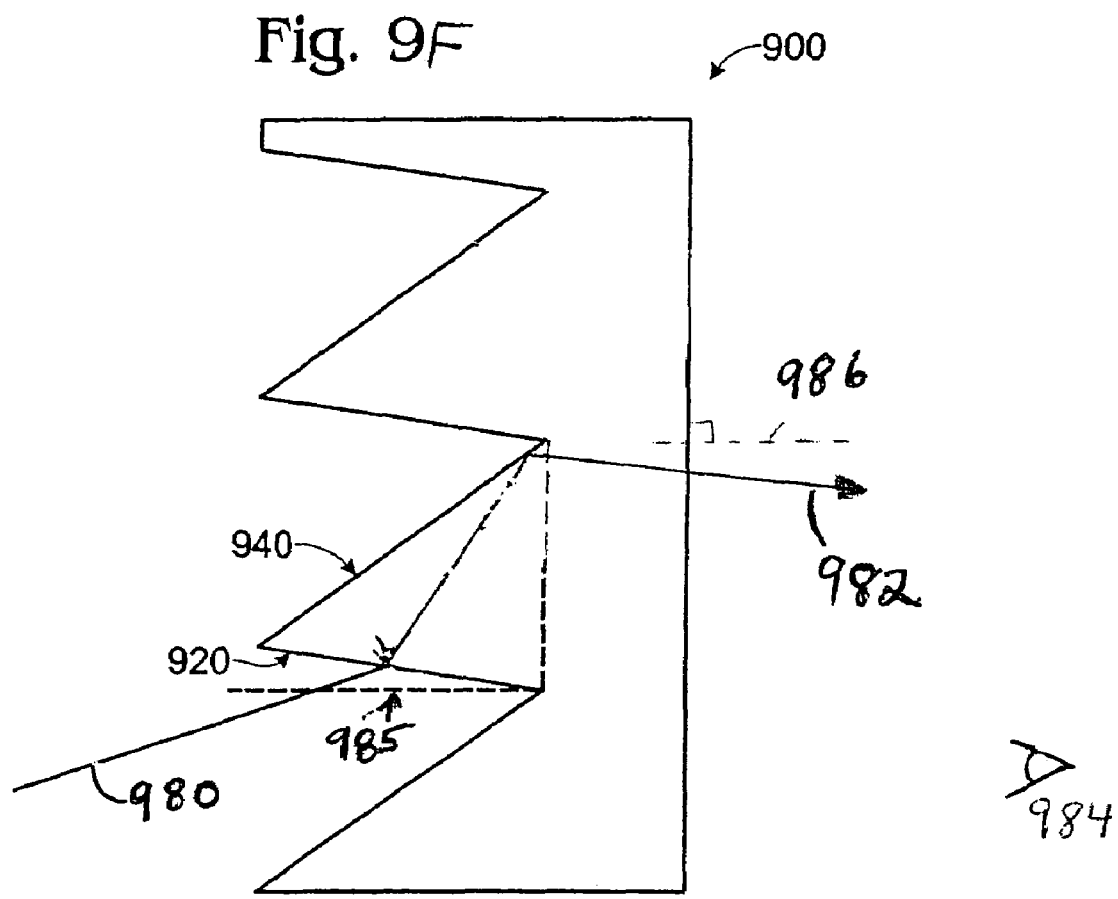

VARIABLE FRESNEL SCREEN FOR USE IN PROJECTION DEVICE

CROSS-REFERENCE TO RELATED APPLICATIONS

The present application is a continuation-in-part of Ser. No. 10/222,083, which was filed on Aug. 16, 2002, now U.S. Pat. No. 6,896,375 and is a continuation-in-part of Ser. No. 10/222,050, which was filed on Aug. 16, 2002, now U.S. Pat. No. 7,009,765, the entire contents of each being incorporated herein by reference in their entirety for all purposes.

BACKGROUND

Many factors influence a consumer's purchase of a television. For example, a consumer may be concerned regarding the size of a unit, the type of unit, the quality of an image produced by the unit, the size of an image produced by the unit, the cost of the unit, etc. Current televisions and similar display devices that are configured to produce large images, such as large screen displays, typically are expensive, heavy and large in size.

Various approaches to reduce the size and cost of large screen displays have been introduced. For example, one approach to reduce the depth of rear projection televisions uses a tilted lens to reflect the image. However, the tilted lens may result in increased keystone effects and distortion. In an attempt to solve the keystone effects and distortion issues curved mirrors have been implemented within the systems. Furthermore, electronic warping chips have been used in such systems.

However, the inventors herein have recognized that such approaches have several issues. First, even using these approaches, rear projection television depth can only be reduced a finite amount. Second, these approaches can increase resolution loss and increase the costs of the units. For example, use of electronic warping chips may necessitate additional pixels which may increase the cost of the systems. Third, the above approaches may require additional manufacturing steps. For example, curved mirrors may require precise manufacturing and set up, and may further increase the cost of the systems.

SUMMARY

In one approach, it is possible to achieve a thin rear projection television using a wide angle lens system. In an embodiment, a fresnel screen is used in which there are at least two spatial zones in the screen with different properties. The at least two zones may be adapted to compensate for the variation in input angle.

BRIEF DESCRIPTION OF THE DRAWINGS

FIG. 1 illustrates one example embodiment of an ultra-thin rear projection display device with planar mirrors parallel to a screen.

FIG. 4 illustrates an embodiment of a rear projection display device with a wide angle lens system.

FIGS. 8, 9, and 9d-9f illustrate operation of a fresnel screen with variations in the input angle of incoming light.

DETAILED DESCRIPTION OF THE DEPICTED EMBODIMENTS

Figure 1A:
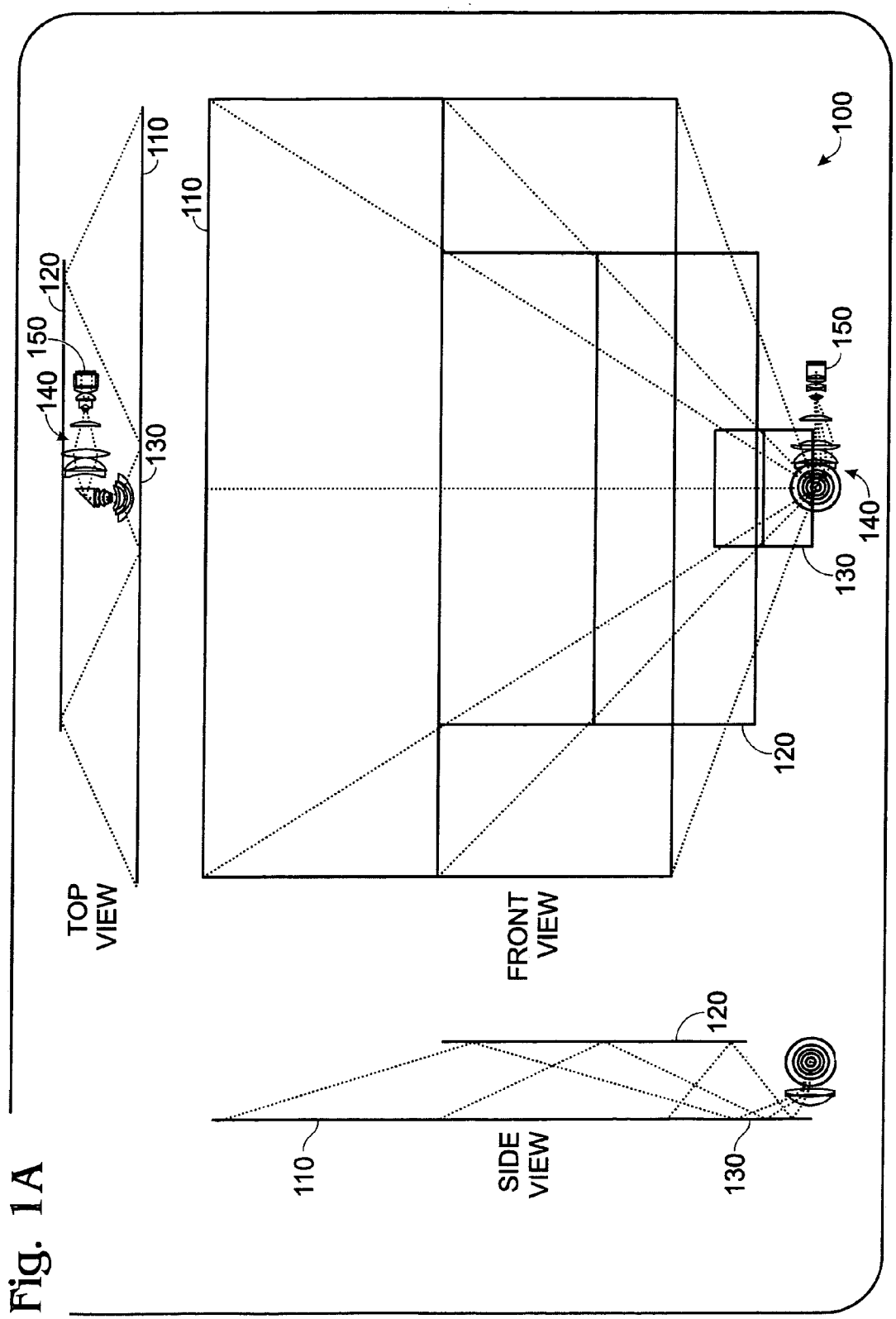
FIGS. 1a and 1b show alternative embodiments in three views of an ultra-thin rear projection display device with planar mirrors parallel to a screen.

Wide angle lens systems having a distorted intermediate image are described below. In the following description, for purposes of explanation, understanding of the invention. It will be apparent, however, to one skilled in the art that the invention can be practiced without these specific details. In some instances, structures and devices are shown in block diagram form in order to avoid obscuring the invention. Further, an image can include a picture, a motion picture, a presentation, a reproduction of the form of a person or object, or a sculptured likeness, or a vivid description or representation, or a figure of speech, especially a metaphor or simile, or a concrete representation, as in art, literature, or music, that is expressive or evocative of something else, or portions or modifications thereof.

The wide angle lens system described herein allows projection devices (e.g., rear projection display devices) to be more compact than would otherwise be possible. According to some embodiments, the lens system includes a wide angle lens stage and a relay lens stage. When operating as a projection device, the relay lens stage projects a distorted intermediate image to the wide angle lens stage, which projects the image for display. The distortion caused by the relay lens stage compensates (i.e., is approximately equal and opposite) for the distortion caused by the wide angle stage. The distortion can be to the image shape and/or the focal plane. When operating as a taking device, the wide angle stage provides a distorted image to the relay lens stage, which compensates for the distortion and provides a less distorted, or even non-distorted image, for capture.

FIG. 1 illustrates one embodiment of a rear projection display device, such as a television, with planar mirrors parallel to a screen. As described in greater detail below, use of planar mirrors parallel to the screen, as well as a wide angle projection lens having an optic axis that is perpendicular to the mirrors and the screen, allows the rear projection display device to be thinner and simpler than prior art rear projection display devices. For example, an ultra-thin rear projection display device as described herein that is less than 7 inches thick can provide a 60-inch image. Further, this can be accomplished without requiring off axis parts, and without requiring curved mirrors. However, it should be appreciated that such devices may be used if desired.

FIG. 1 shows an example embodiment of the internal componentry and screen of a display device. As described in more detail below, the elements shown in FIG. 1 can be housed in a frame assembly.

In one embodiment, rear projection display device 100 includes screen 110, back plate mirror 120, intermediate mirror 130, lens system 140 and digital micromirror device (DMD) 150. Lens system 140 and digital micromirror device (DMD) 150 are described in more detail below, and can be various types of systems, such as, but not limited to those shown in FIG. 2 or 3. Other components of the rear projection display device, such as image-generating components, are not illustrated for reasons of simplicity of description.

An image can be provided to DMD 150 in any manner known in the art. DMD 150 selectively reflects light from a light source (not shown in FIG. 1) to lens system 140. Other suitable devices (e.g., microelectromechanical systems (MEMS), grating light valve (GLV), liquid crystal display (LCD), liquid crystal on silicon (LCOS)) may be used to provide an image to lens system 140.

In one embodiment, DMD 150 is offset from the optic axis of lens system 140 such that only a portion (e.g., between 90% and 80%, 80%-70%, 70%-60%, 60%-50%, 50%-40%, 40%-30%, 30%-20%, 20%-10%, 80%-40%, 40%-10% or therebetween) of the available lens field is used. By offsetting DMD 150 with respect to the optic axis of lens system 140, the image from DMD 150 is projected by lens system 140 in the upper portion of the lens field to intermediate mirror 130. Alternatively, a lower portion of the lens field can be used to project an image to intermediate mirror 130. In such an embodiment, lens system 140 would be above intermediate mirror 130, which would be above back plate mirror 120.

In one example, lens system 140 is a wide angle lens system. Generally, a wide angle lens has a field angle greater than 100°. For example, lens system 140 can have a field angle of 152° or more. It should be understood that lenses having greater or lesser field angles also may be used. For example, the field angle can also be 130° or more. In general, the wider the angle of lens system 140, the thinner display device 100 can be made. Description of an exemplary wide angle lens system is described in greater detail below.

Intermediate mirror 130 reflects the image to back plate mirror 120, which reflects the image to screen 110, which can be, for example, a fresnel screen, as described in more detail below. The fresnel screen, in one example, is a single-sided fresnel lens, with grooves located on the side facing the input light rays. In an alternative embodiment, the fresnel screens may be a dual-sided screen, with additional features, such as lenticular lenses, bumps or other surface irregularities on the opposing side, facing away from, the input light rays. Also note that the grooves may be triangular in shape, circular, oval, U-shaped, or V-shaped.

As described above, the image may be reflected from intermediate mirror 130 to back plate mirror 120. Back plate mirror 120 may be a planar mirror, which may be disposed parallel to screen 110 and perpendicular to the optic axis of lens system 140. Because the optic axis of lens system 140 is perpendicular to intermediate mirror 130 and both intermediate mirror 130 and back plate mirror 120 are planar and parallel to screen 110, distortion, such as "keystone" distortion, caused by angled lenses and/or aspherical mirrors, may be substantially reduced in display device 100. This arrangement may simplify the design of display device 100 and may reduce the cost and complexity of manufacturing the system.

Keystone distortion may be further reduced by using an on-axis configuration with an offset DMD. Therefore, the present system does not require the use of tilting lenses or decenters, although these can be used if desired. Further advantageous results that may be obtained with the present system are described in more detail below.

DMD 150 and lens system 140 may be referred to as a light ray source unit. Further, DMD 150, lens system 140, and parallel mirrors 120 and 130 may also be referred to as a light ray source unit.

Figure 2:
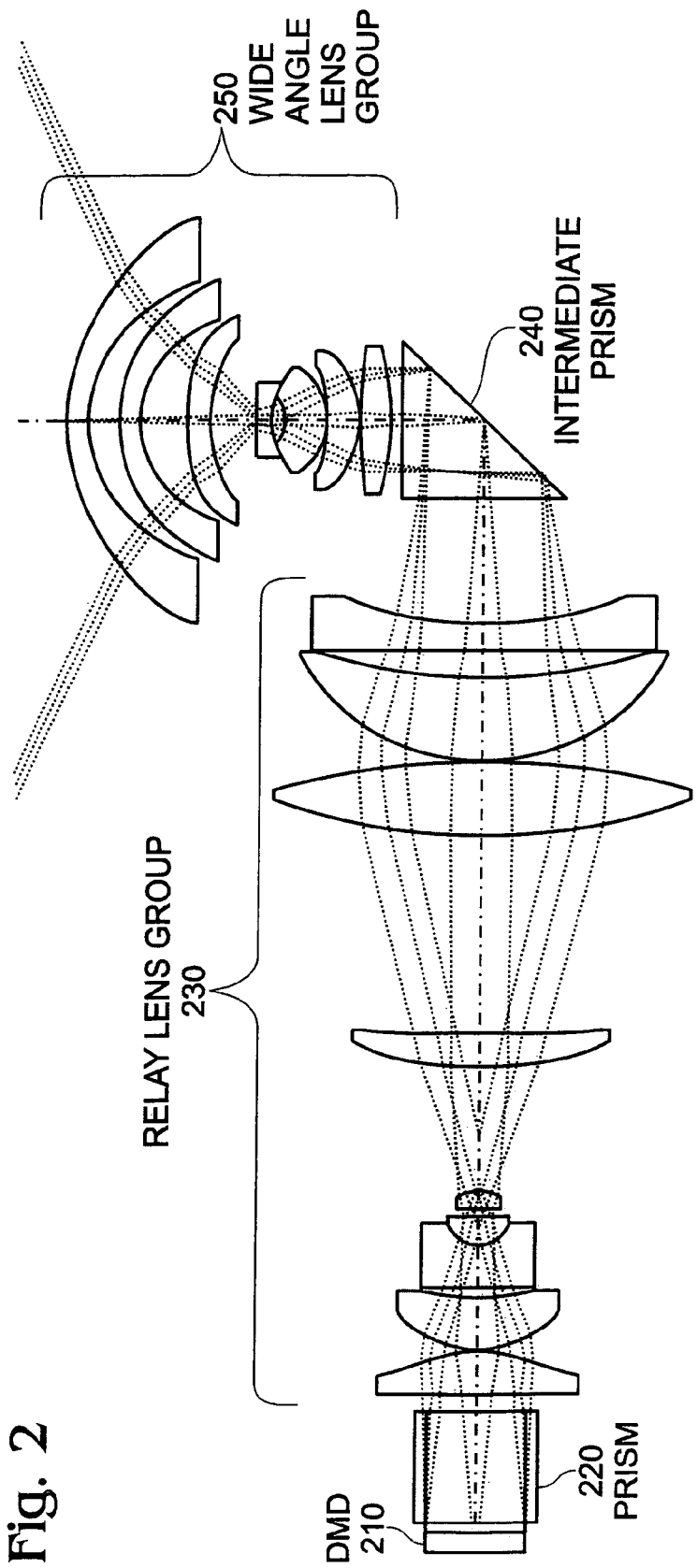
FIG. 2 illustrates one embodiment of a folded wide angle lens system.

FIG. 1a shows an example embodiment of a rear projection display device with a front, side, and top view where DMD 150 and wide angle lens system 140 correspond to the example embodiment described in FIG. 2. FIG. 1a shows the relative angles and positioning of the various components. Further, FIG. 1a shows the progressively larger areas of mirrors 130 and 120, and the even larger area screen 110.

Also, as shown by FIG. 1a, by using the intermediate prism (or similar optics) of the lens system 140 shown in FIG. 2, a more compact (smaller depth) rear projection unit can be obtained. In one example, it can be possible to achieve, for example, a 154° projection angle and 0.2 throw ratio with 2 parallel flat mirrors with a 60-inch screen and a depth of less than 7 inches.

Figure 1B:
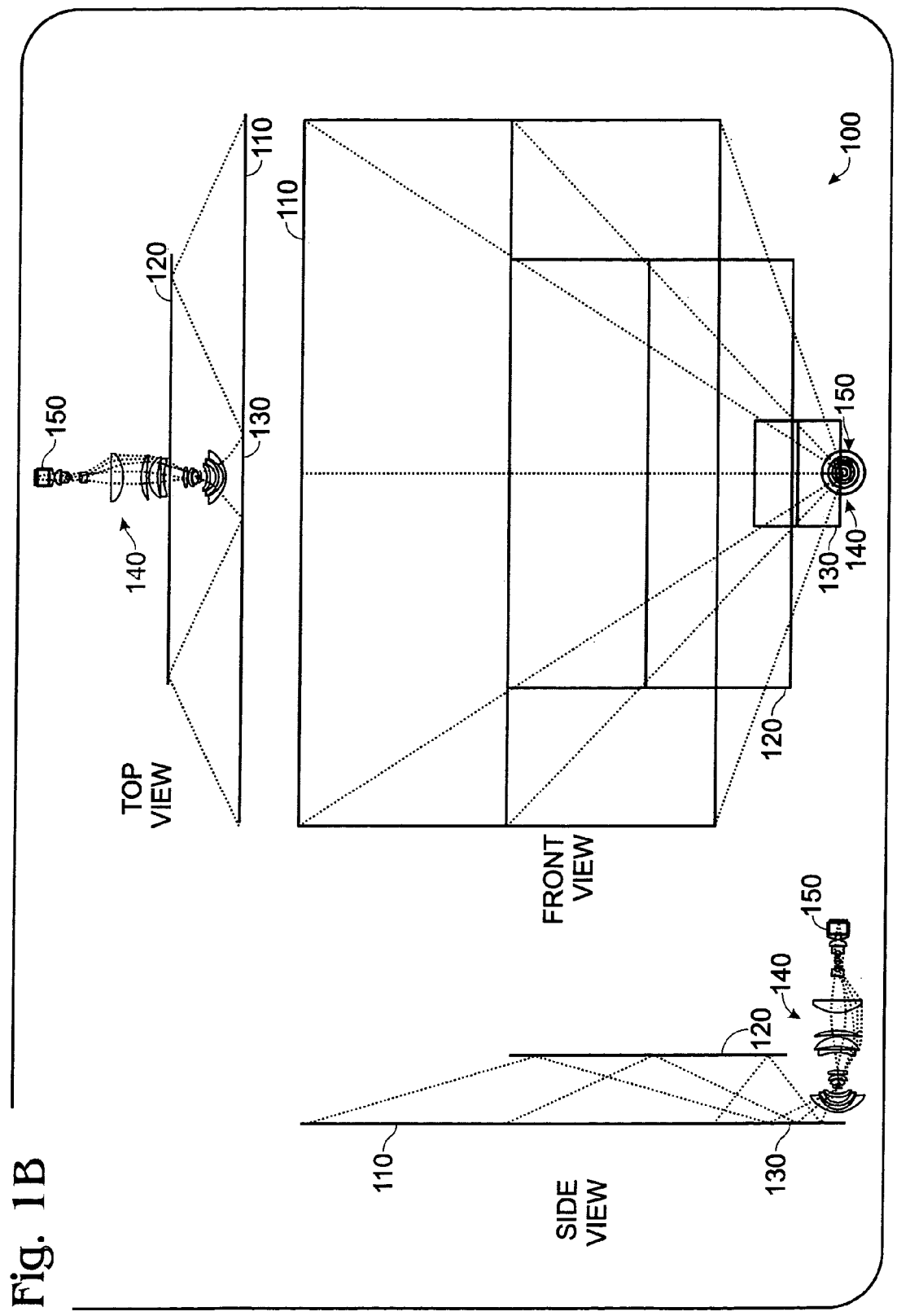
Figure 3:
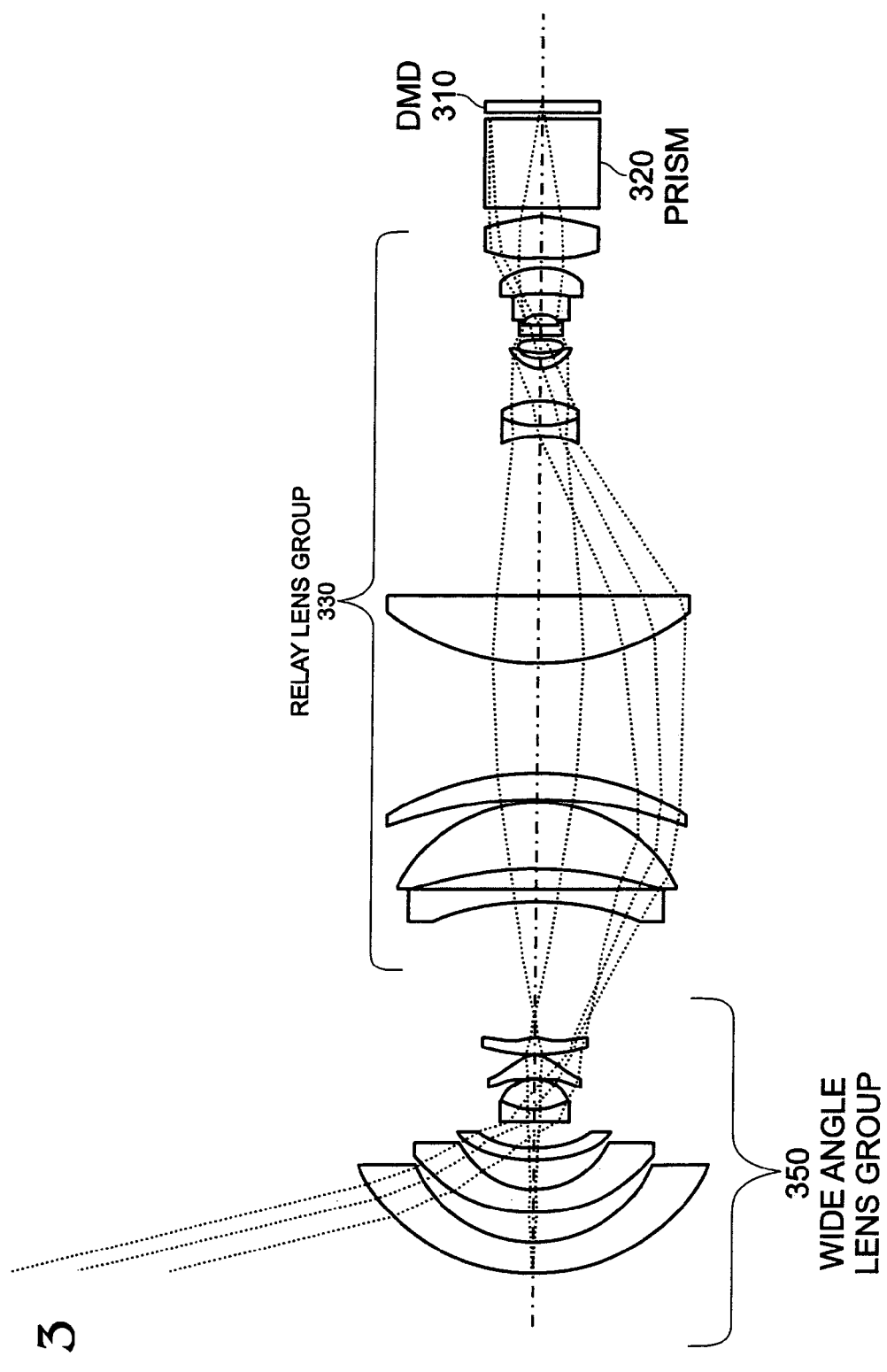
FIG. 3 illustrates another embodiment of a wide angle lens system.

FIG. 1b shows an example embodiment of a rear projection display device with a front, side, and top view where the DMD 150 and wide angle lens system 140 correspond to the example embodiment described in FIG. 3.

Note that, different configurations for the light path may be possible for the embodiments shown in FIGS. 1a and 1b. For example, in alternative embodiments for FIGS. 1a and 1b, 120 can be the screen and thus only a single mirror is used. Further, in still other embodiments, 130 may be the screen, and thus, no mirror is used.

FIG. 2 illustrates one embodiment of a folded wide angle lens system having a distorted intermediate image. While the lens system of FIG. 2 is described as a projection lens system, the lens system can also be used for image capture, for example, by a camera.

In the exemplary wide angle lens system shown in FIG. 2, DMD 210 provides an image to the lens system. As described above, other types of devices may be used to provide an image to the lens system. Prism 220 (or other suitable optics) may be configured to direct the image to relay lens group 230. Relay lens group 230 projects the image from prism 220 to prism 240 and distorts the image such that intermediate prism 240 receives an intentionally distorted intermediate image.

In one embodiment, relay lens group 230 includes 9 lenses; however, any number of lenses can be used, based on, for example, the desired distortion of the intermediate image, or the overall size of the lens system. The distortion to be caused by relay lens group 230 is equal and opposite the distortion caused by wide angle lens group 250. In one embodiment, the intermediate image is approximately a half-circle image in a warped image plane. In alternate embodiments, other types of distortion can be used. For example, if the full lens field is to be used, the distorted intermediate image would be a generally circular image. The image plane may or may not be warped.

As shown in FIG. 2, intermediate prism 240 (or other suitable optics) may provides a 90° fold of the image path. As described below with respect to FIG. 3, the fold is not required. Alternatively, other fold angles, for example, 45°, 30°, 135°, 180° (e.g., via two prisms) could be used.

After passing through intermediate prisms 240, the image path extends to wide angle lens group 250. Wide angle lens group 250 may be configured to project the distorted intermediate image to a screen for display. Because wide angle lens group 250 causes distortion to the image to be projected and the intermediate image has been pre-distorted by relay lens group 230, the resulting image projected by the lens system may have little or no distortion. In one embodiment, the total distortion caused by relay lens group 230, wide angle lens group 250 and any associated prisms is less than 3%, but could be less than 1%, depending on the lens configurations. It should be appreciated that low cost systems may be used with greater distortion.

In one embodiment, the optic axes of the lenses of relay lens group 230 are aligned. Similarly, the optic axes of the lenses of wide angle lens group 250 also may be aligned. Typically, wide angle lens group 250 provides a field angle of greater than 100°. In one embodiment, the field angle is 153°; however, any other suitable angle can be provided. In one embodiment, the optical axis of wide angle lens group 250 is perpendicular to the screen so that keystone, or trapezoidal, distortion is reduced.

FIG. 3 illustrates another alternative embodiment of a wide angle lens system having a distorted intermediate image. The lens system of FIG. 3 is similar to the lens system of FIG. 2 except that the lens system of FIG. 3 is not folded. That is, wide angle lens system 350 is co-axial with relay lens system 330. The lens system of FIG. 3 does not include an intermediate prism. However, an intermediate prism can be included, if desired.

In one embodiment, the lens system of FIG. 3 has the following prescription:

| Surface | RDY | THI | RMD | GLA |
|---|---|---|---|---|
| 1: | 46.74531 | 4.000000 | | NBF1_HOYA |
| 2: | 28.81163 | 5.051213 | | |
| 3: | 30.58292 | 4.000000 | | NBFD10_HOYA |
| 4: | 21.01576 | 8.441106 | | |
| 5: | 129.13928 | 4.000000 | | SLAM60_OHARA |
| | ASP: | | | |
| | K: 0.000000 | | | |
| | IC: YES CUF: 0.000000 | | | |
| | A: 0.664982E−04 B: −.187975E−06 C: 0.420794E−09 | | | |
| | D: −.348519E−12 | | | |
| 6: | 21.14941 | 8.859193 | | |
| | ASP: | | | |
| | K: 0.000000 | | | |
| | IC: YES CUF: 0.000000 | | | |
| | A: −.367450E−04 B: 0.130594E−06 C: −.665374E−09 | | | |
| | D: 0.794813E−12 | | | |
| 7: | 78.00018 | 3.124861 | | FDS90_HOYA |
| 8: | 16.67079 | 9.473114 | | BACD16_HOYA |
| 9: | −13.03245 | 0.200000 | | |
| 10: | −17.74399 | 6.650512 | | MNBF1_HOYA |
| | ASP: | | | |
| | K: 0.000000 | | | |
| | IC: YES CUF: 0.000000 | | | |

-continued

| Surface | RDY | THI | RMD | GLA |
|---|---|---|---|---|
| | A: 0.314557E−03 B: −.254460E−05 C: 0.149709E−07 | | | |
| | D: −.573297E−10 | | | |
| 11: | −14.40905 | 0.200000 | | |
| | ASP: | | | |
| | K: 0.000000 | | | |
| | IC: YES CUF: 0.000000 | | | |
| | A: −.440469E−04 B: 0.237538E−05 C: −.134637E−07 | | | |
| | D: 0.222969E−10 | | | |
| 12: | 131.97096 | 6.000000 | | MNBF1_HOYA |
| | ASP: | | | |
| | K: 0.000000 | | | |
| | IC: YES CUF: 0.000000 | | | |
| | A: 0.711368E−04 B: −.624364E−06 C: 0.210000E−08 | | | |
| | D: −.350000E−11 | | | |
| 13: | −15.59413 | 2.000000 | | |
| | ASP: | | | |
| | K: 0.000000 | | | |
| | IC: YES CUF: 0.000000 | | | |
| | A: 0.257396E−03 B: −.884746E−06 C: 0.186450E−08 | | | |
| | D: 0.216077E−11 | | | |
| 14: | INFINITY | 30.000000 | | FD60_HOYA |
| 15: | INFINITY | 24.565488 | | |
| 16: | −64.35637 | 4.999034 | | FD60_HOYA |
| 17: | −1966.99974 | 5.494742 | | |
| 18: | −96.81620 | 16.104081 | | NBFD13_HOYA |
| 19: | −39.51766 | 0.200000 | | |
| 20: | 136.11245 | 14.269098 | | LAC8_HOYA |
| 21: | −114.50422 | 39.301091 | | |
| 22: | −250.53752 | 5.915028 | | BACD16_HOYA |
| 23: | −62.97973 | 24.296450 | | |
| STO: | 8.12022 | 3.000000 | | FDS90_HOYA |
| 25: | 7.27512 | 2.000000 | | |
| 26: | −67.85690 | 5.522870 | | BACD16_HOYA |
| 27: | −5.88750 | 7.902370 | | FDS90_HOYA |
| 28: | 135.96725 | 1.688647 | | |
| 29: | −35.98083 | 10.637917 | | MNBF1_HOYA |
| | ASP: | | | |
| | K: 0.000000 | | | |
| | IC: YES CUF: 0.000000 | | | |
| | A: 0.956626E−04 B: 0.298084E−06 C: −.100781E−07 | | | |
| | D: 0.371253E−10 | | | |
| 30: | −16.84259 | 0.200000 | | |
| | ASP: | | | |
| | K: 0.000000 | | | |
| | IC: YES CUF: 0.000000 | | | |
| | A: 0.434637E−04 B: 0.131005E−06 C: −.120433E−08 | | | |
| | D: 0.718134E−12 | | | |
| 31: | 29.02346 | 08.028674 | | SLAH60_OHARA |
| | ASP: | | | |
| | K: 0.000000 | | | |
| | IC: YES CUF: 0.000000 | | | |
| | A: 0.696210E−05 B: −.847612E−07 C: 0.104328E−09 | | | |
| | D: −.182720E−12 | | | |
| 32: | 186.81664 | 4.000000 | | |
| | ASP: | | | |
| | K: 0.000000 | | | |
| | IC: YES CUF: 0.000000 | | | |
| | A: −.196461E−05 B: 0.343490E−07 C: −.146991E−09 | | | |
| | D: 0.000000E+00 | | | |
| 33: | INFINITY | 21.000000 | | BSC7_HOYA |
| 34: | INFINITY | 2.000000 | | |
| 35: | INFINITY | 3.000000 | | FC5_HOYA |
| 36: | INFINITY | 0.440000 | | |

In the above prescription, surfaces 1-13 correspond to wide angle lens group 350 and surfaces 16-32 correspond to relay lens group 330. In alternate embodiments, other prescriptions and/or other materials can also be used.

The above example configurations advantageously use a wide angle lens. In other words, wide angle lenses typically cause up to 100% barrel distortion, which can be difficult to reduce at low focal lengths. However, as described above, by pre-distorting the image via the relay lens, the problem of barrel distortion may be substantially reduced.

Referring now to FIG. 4, a schematic representation of another embodiment of a rear projection display device having a wide angle lens is shown. Display device 400 includes screen 410, wide angle lens system 420 and DMD 430. In one embodiment, screen 410 is a fresnel screen as described in greater detail in below. Further, in one example, the system of FIG. 2 can be used. In still another example, the system of FIG. 3 can be used.

An image is generated by optical engine components (not shown in FIG. 4) that are known in the art and directed to wide angle lens system 420 via DMD 430. In alternate embodiments, DMD 430 can be replaced by other components, for example, microelectromechanical systems (MEMS), grating light valves (GLV), liquid crystal display (LCD), liquid crystal on silicon (LCOS), etc. The optic axis of DMD 430 is aligned with the optic axis of wide angle lens system 420 so that the full lens field is used to project the image to screen 410.

As described herein, an image is projected on a display surface, such as a screen through a wide angle lens system. The screen can be a fresnel screen. However, many other objects can operate as a screen for purposes of displaying an image. In general, any object that diffuses light can be used as a screen.

Figure 5:
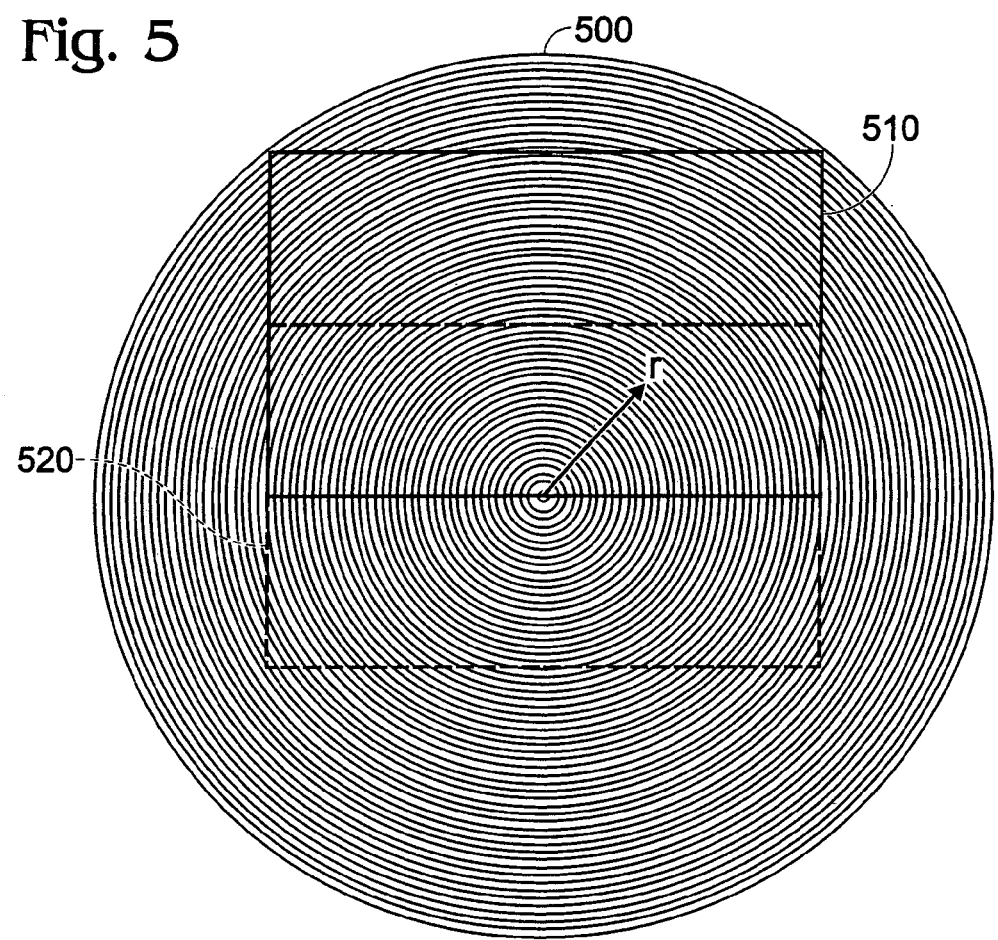
FIG. 5 shows a fresnel screen with outlines of sections to be used for rear projection screens.

FIG. 5 illustrates a fresnel screen having circular grooves (with radius r) with exemplary outlines of sections which may be used for rear projection screens. FIG. 5 provides a conceptual illustration of the sections of a fresnel screen that can be used for various rear projection display devices. The fresnel screen, in this example, can be described with two angles. The face angle is defined as the angle of the surface of each individual groove through which light passes as it enters, or in the case of some refractive designs, exits the fresnel screen relative to the optic axis of the lens. The groove angle is the angle formed between the input face and the reflection face, or in the case of a refractive lens, between the optical face of the groove and the non-optical face.

Figure 6:
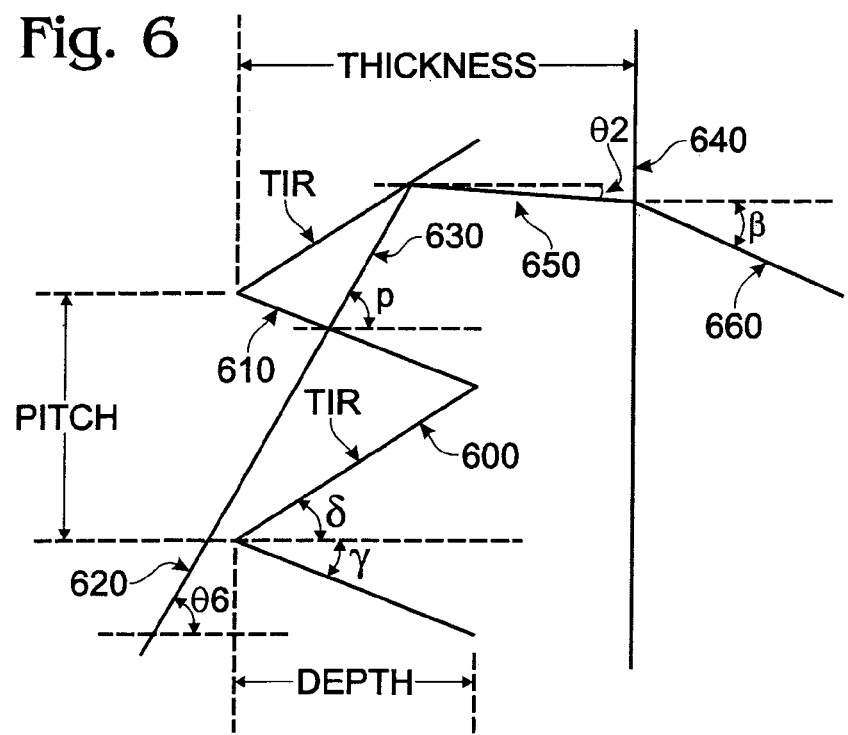
FIG. 6 illustrates a profile cross-sectional view of an exemplary resnel screen according to an embodiment of the present disclosure.

Details of the fresnel screen nomenclature is illustrated with regard to FIG. 6. Specifically, FIG. 6 illustrates a profile cross-sectional view of a fresnel screen (600) design. As illustrated, θ6 is the input angle, or the angle of input ray 620 from horizontal; γ is the face angle, or the angle of refraction face 610 from horizontal; δ is the reflection face angle, or the angle of refraction face 600 from horizontal; ρ is the refracted ray angle, or the angle of refracted ray 630 from horizontal; θ2 is the reflected ray angle, or the angle of reflected ray 650 from horizontal; and β is the output ray angle, or the angle of output ray 660 from horizontal. Note also that faces 610 and 600 can be referred to as slopes and drafts. Further, the pitch is labeled as the distance between peaks, or valleys, and the depth of the faces is also indicated. Finally, the thickness of the fresnel screen is also indicated as the distance from the tip of the groove to the base of the groove. Note that the labels of FIG. 6 show labels of the components of an example fresnel screen. However, since there can be variations made to the lens (such as rounding of corners, and other variations) these labels are merely for illustrative purposes and not meant to be limited to the exact representation made in FIG. 6.

Also, in one example, the fresnel screen has a total image reflection (TIR) surface on one side of each of the sloped surfaces forming the groove. In this example, the TIR is opposite the side receiving the input light ray 620. However, other sloped surfaces can also be a TIR. Furthermore, only a portion of the sloped surfaces can be a TIR, if desired.

While FIG. 6, and other figures, show the fresnel screen having triangular shaped grooves and peaks, other shapes can also be used.

Referring back to FIG. 5, in one embodiment, fresnel screen 500 can have many concentric grooves having one or more predetermined groove angles. Techniques for manufacturing and using fresnel screens include injection molding, extruding, or computer-controlled machining. In a rear projection display device in which the full lens field of the projection lens system is used, center portion 520 of fresnel screen 500 may be used for a lens of the display device.

Dashed rectangle 520 provides an indication of a screen from the center portion of fresnel screen 500. The size and shape of the portion of the lens to be used may correspond to the size and shape of the screen of the display device. For one example, rear projection display, the center of section 520 to be used for a screen is the center of fresnel screen 520.

When using an offset DMD (or other device) which uses only a portion of the projection lens field, the section of fresnel screen 500 used for a screen is correspondingly offset from the center of fresnel screen 500. For example, if the top half of the projection lens field is used, the bottom edge of screen portion 510 passes through the center of fresnel screen 500. Screen portion 510 may be referred to as a rainbow pattern since the center of the grooves is offset from the center of the screen portion. Note that a variety of offsets can be used other than the complete offset shown in 510 where the bottom edge passes through the center of the groove pattern.

Note that the fresnel screen can be formed with circular grooves as shown in FIG. 5. However, in alternate embodiments, straight grooves (either vertical, horizontal, or some other orientation) or other suitable topography may be used, depending on the optics and lenses used, or depending on the type of DMD used.

Figure 7:
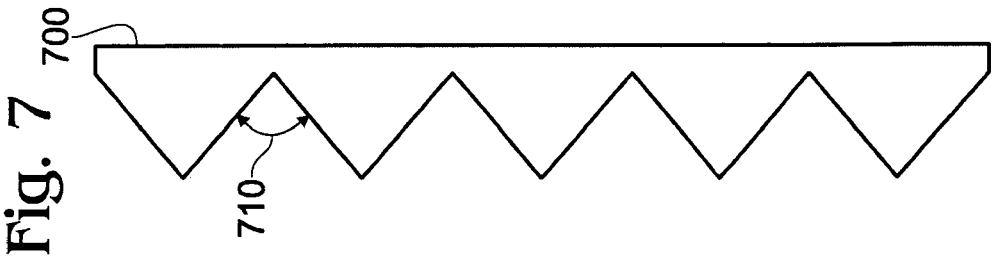
FIG. 7 illustrates a cross-sectional profile of a fresnel screen having a groove angle of 39°.

FIG. 7 illustrates a cross-sectional profile view of an example fresnel screen 700 having a groove angle 710 of 39°. The screen of FIG. 7 can be used with, for example, the display system of FIGS. 1, 1a, and/or 1b. When used with a display system as illustrated above, with an offset as described with respect to FIG. 2, the groove angle of 39° can provide a balance between diamond cutter structural integrity and lens performance.

It should be noted that in some embodiments, as the groove angle increases, the image projected to the bottom center of lens 700 may become dark as rays pass through the lens without being reflected. Similarly, as the groove angle decreases, the image projected to the top corners of lens 500 may become dark as reflected rays are directed down and away from the viewer. Also, as the groove angle decreases, some tools used to manufacture lens 500 may become too weak to work effectively.

In an alternative embodiment, a groove angle of 35° can be used to improve the brightness in the bottom center of the screen (due to the potential for lost light, discussed below with regard to FIGS. 8 and 9).

Figure 9:
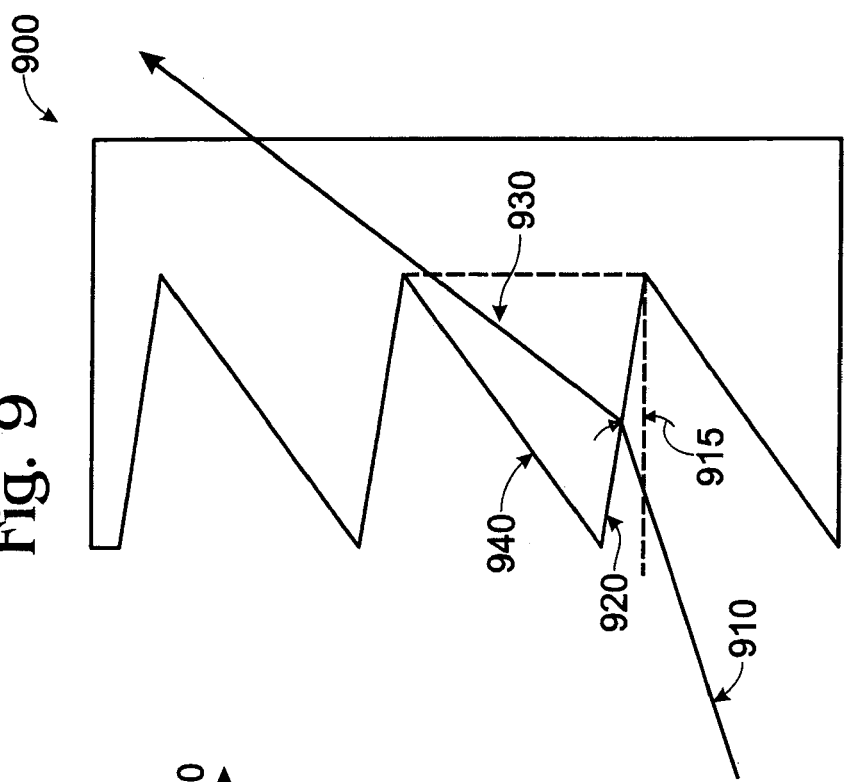
Figure 8:
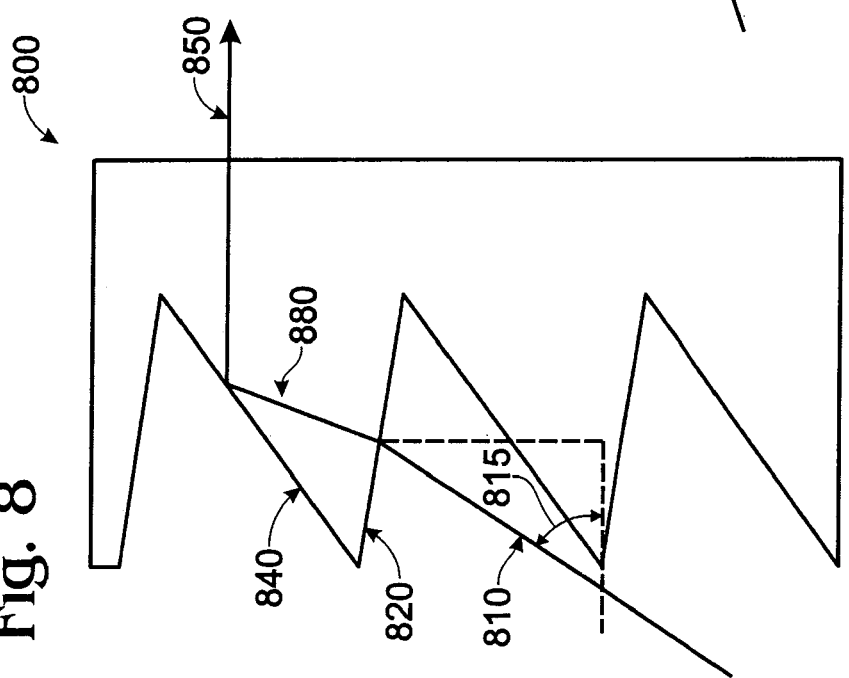

Briefly, FIGS. 8 and 9 illustrate the effect of varying input angles. Specifically, FIG. 8 illustrates the operation of a fresnel screen in the case where the input angle is high enough to allow proper reflection via the total image reflection (TIR) surface. Input light ray 810, e.g. from the mirror 120, may enter fresnel screen 800 at input angle 815. The ray may pass through groove face 820 and may be slightly refracted, or bent. Input angle 815 may be understood to be the angle of input light 810 from horizontal, as described above with regard to FIG. 6. Refracted light 830 is reflected by reflection face 840, so that reflected light 850 passes through relatively normal to the plane of fresnel screen 800 and out toward a viewer (not shown). Ideally, the light rays exit fresnel screen 800 relatively normal (i.e., substantially at 90°) to the plane of the output side of fresnel screen 800. Reflection face 840 is a total image reflection (TIR) surface in this example. TIR is a phenomenon determined by the refractive index of a material. Specifically, TRI is the reflection that occurs within a substance because the angle of incidence of light striking a boundary is in excess of the critical angle of the substance.

However, as the input angle decreases, the operation of the fresnel screen may degrade. FIG. 9 illustrates the operation of a fresnel screen when light misses a total image reflection (TIR) surface. As shown in FIG. 9, there is an input angle 915 at which refracted light 910 misses reflection face 940, as shown by refracted light 930. When refracted light 910 misses reflection face 940, it passes through fresnel screen 900 without being reflected. This may occur, for example, at the grooves closest to the center of fresnel screen 800, or at the grooves closest to the bottom of the screen if selected from region 510 of FIG. 5. Refracted light 930 can be viewed as lost, resulting in a reduction in contrast at fresnel grooves where refracted light 910 misses reflection face 940, which may cause dark spots in an image at those fresnel grooves. In some cases, fresnel screens with constant angles can be designed so that light input at virtually any angle reflects off of each reflection face 940 of the fresnel screen.

Figure 9A:
FIGS. 9a and 9b show uniformity before and after a uniform fresnel screen.
Figure 9B:

The uniformity of an image before the fresnel screen can be compared with the uniformity of an image just after the fresnel screen. FIGS. 9a and 9b show such a comparison, with FIG. 9a showing uniformity before the fresnel screen. FIG. 9b shows the result for conventional fresnel screens on current rear projection televisions, such as fresnel screens with constant pitch, slope, or groove angle, in which the input light ray impinges on the flat side of a fresnel, and then exits through slopes and/or drafts. Thus, when used for large screens, a fresnel screen, or fresnel lens, with a single groove angle throughout may result in inconsistent illumination, in some examples.

Specifically, as shown by FIG. 9b, dark areas can occur at the top corners, and bottom center of the screen. The dark area at the bottom center can be caused by light missing the TIR surface, referred to as ghosting, or ghost rays, described above with regard to FIG. 9. One technique to reduce ghost rays and improve contrast in this area is to change the reflection face angle such that light missing the TIR surface is reduced. In one example, described in more detail below, the peak angle, or groove angle, can be reduced in this area.

Additionally, the dark bottom center can be caused by the reflected light rays traveling downward relative to the viewer, as shown in FIG. 9d, when trying to collect as much light as possible. This downward light does may not get redirected to the viewer as well, and thus can appear dark.

Specifically, FIG. 9d illustrates the operation of a fresnel screen when light is directed downward, rather than normal to the screen, where the viewer may be positioned higher than the bottom of the screen. As shown in FIG. 9d, there is an input angle 955 at which refracted light 960 impinges on reflection face 940, as shown by refracted light 962, and is reflected downward from normal 964. When refracted light 960 is reflected in this way, it passes through fresnel screen 900 at a downward angle, which may cause dark spots in an image at those fresnel grooves. This may occur, for example, at the grooves closest to the center of fresnel screen 900, or at the grooves closest to the bottom of the screen if selected from region 510 of FIG. 5.

Again, this downward refelection can be reduced, in one example, by reducing the peak angle, or groove angle, of the fresnel screen in this area. As such, reducing the peak angle, or groove angle, can reduce two potential causes of the perceived dark area in the bottom center of the screen. In this way, the face or peak angles, or groove angles, can be designed so that light from the edges of the screen, where the input rays are shallow, can direct the reflected light normal to the lens to improve perceived brightness of the image.

Referring back to FIG. 9b, dark areas may also occur at the top corners of the screen. The dark areas at the top corners can be caused by light that impinges on the TIR surface and is directed out normal to the viewer. In this case, however, even though light rays are directed out of the fresnel screen normal to the viewer, if the viewer is located below this ray, the top corners may appear dark. Specifically, FIG. 9e illustrates the operation of a fresnel screen when light is directed normal, rather than downward. As shown in FIG. 9e, there is an input angle 975 at which light 970 impinges on reflection face 940, as shown by refracted light 972, and is reflected out normal to the right side of the screen. When light 970 is reflected in this way, it may cause dark spots in an image at those fresnel grooves when a viewer 974 is located at a lower position relative to the top of the screen. This may occur, for example, at the grooves closest to the top, such as top corners, of fresnel screen 900. However, in some cases, it can be desirable to have the exit ray normal to the screen. In such cases, a peak angle, or groove angle, of 41° can be used.

If desired, this normal reflection can be reduced, in one example, by increasing the peak angle, or groove angle, of the fresnel screen in this area. As such, increasing the peak angle, or groove angle, can cause the exiting light to be angled downward toward the viewer, as shown by FIG. 9f. In other words, the face angles can be designed so that light from the edged of the screen, where the input rays are steep, can direct the reflected light toward the center of the lens to improve perceived brightness at the edges of the image.

Specifically, FIG. 9f illustrates the operation of a fresnel screen when light is directed slightly downward at the edges, rather than normal. As shown in FIG. 9f, there is an input angle 985 at which light 980 impinges on reflection face 940, as shown by refracted light 982, and is reflected downward relative to normal 986. When light 980 is reflected in this way, it can reduce perceived darkness in an image at those fresnel grooves when a viewer 984 is located at a lower position relative to the top of the screen. This may occur, for example, at the grooves closest to the top, such as top corners, of fresnel screen 900. Thus, by increasing the peak angle, or groove angle, at the top of the screen, such as at the top corners, it is possible to improve the perceived brightness of an image by the viewer. In one example, an angle slightly larger than 41° provides good uniformity at the top corners of a fresnel screen.

Figure 9C:
FIG. 9c shows uniformity after an example fresnel screen having variable features as described herein.

Therefore, one example solution for improved uniformity is to use a fresnel screen with different zones having different characteristics, such as a variable peak angle, or variable groove angle. One specific angle provides for smaller peak, or groove, angles at the bottom center of the screen, and larger peak, or groove, angles at the top corners of the screen. Various alternative embodiments are described below. In one example, by using a variable pitch, or variable angle, or variable depth, fresnel screen as described in various examples below, it is possible to provide uniformity after the fresnel to be substantially the same as that before the screen, as shown by FIG. 9c. Alternatively, a fresnel screen can be used with continuously variable fresnel groove characteristics in different locations of the screen can be used.

Figure 10A:
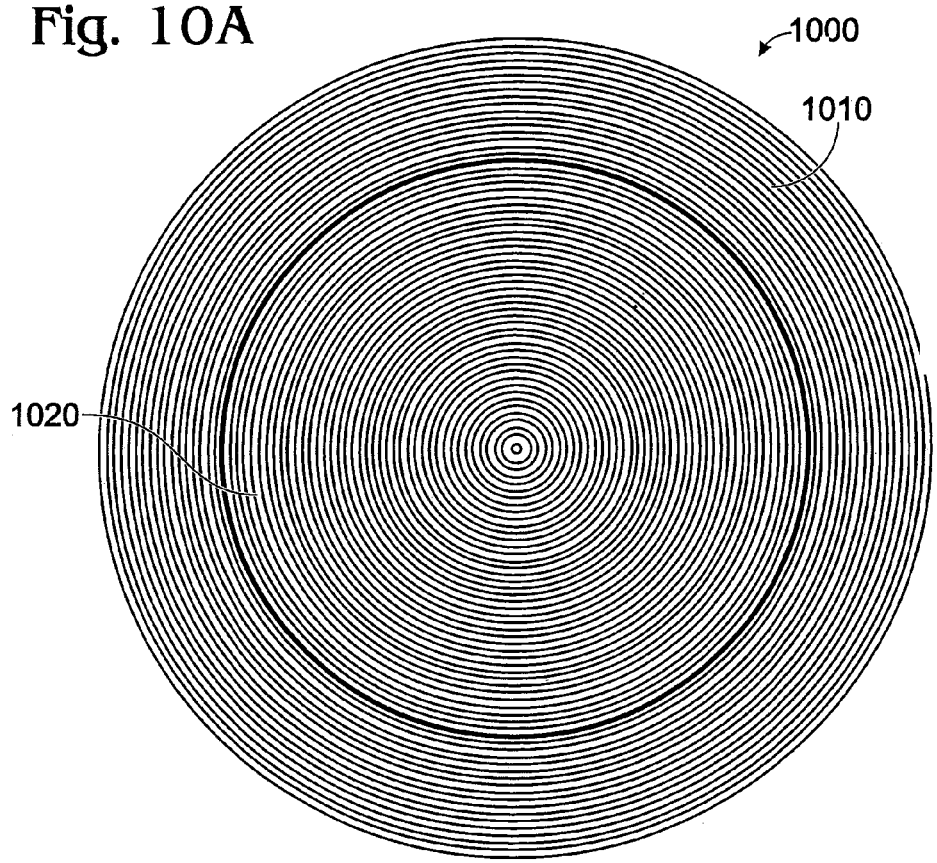
FIG. 10a illustrates a front view of a fresnel screen having two zones, each having a different groove angle.

In one example, FIG. 10*a* illustrates a front view of a fresnel screen having two zones each having a different groove angle. The embodiment of FIG. 10*a* illustrates two zones with two groove angles; however, any number of zones with corresponding groove angles can be used. The groove angle of a lens can also vary continuously. Further, while the example of FIG. 10*a* illustrates circular regions, other shapes can also be used.

In one embodiment, interior region 1020 has grooves of approximately 35°; however, other groove angles can also be used. Outer region 1010 has grooves of approximately 41°; however, other groove angles can also be used. In alternate embodiments, interior region 1020 and outer region 1010 can provide any combination of refraction and/or reflection lenses. In one embodiment, the projector side of lens 1000 has grooves and the viewer side is planar. In an alternate embodiment, lens 1000 has grooves on both sides. Moreover, in some embodiments, the grooves for one zone are on the projection side of the lens and the grooves for another zone are on the viewer side of the lens.

Figure 10B:
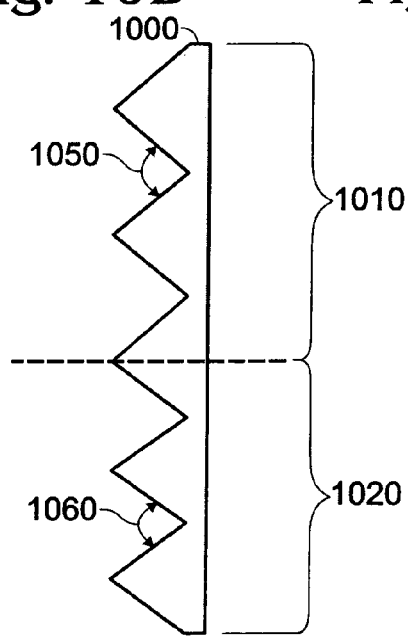
FIG. 10b illustrates a cross-sectional view of a two-zone fresnel screen having a first zone with a groove angle of 35° and a second zone having a groove angle of 41°.

FIG. 10*b* illustrates a cross-sectional profile view of a two-zone fresnel screen having a first zone with a groove angle of 35° and a second zone having a groove angle of 41°. The lens of FIG. 10*b* can be used with, for example, the display system of FIG. 1, 1*a*, 1*b*, or 4, for example. The lens of FIG. 10*b* can provide improved uniformity as compared to a lens with a single zone of consistent characteristics of the fresnel screen face (e.g., as shown in FIGS. 8 and 9).

In one embodiment, the grooves of zone 1020 provide a refractive lens and the grooves of zone 1010 provide a total internal reflection (TIR) lens. The refractive and reflective zones of lens 1000 can be on the same side of the lens (e.g., the projector side) or the refractive and reflective zones of lens 1000 can be on opposite sides (e.g., reflective on the projector side and refractive on the viewer side). As described in greater detail below, transition regions can be used to reduce or even eliminate image artifacts caused by transitions between zones. For a double-sided lens, two single-sided lenses can be aligned and the planar sides of each lens can be bonded together. Alternatively, one side of the lens can be manufactured as described above and additional grooves can be formed directly on the lens material.

Again, as noted with regard to FIGS. 8 and 9, as the angle of the input light decreases, there is an angle at which the refracted light may miss reflection face 840. This occurs, for example, at the bottom center of the screen at the grooves closest to the fresnel center. This light can be lost and travels through the fresnel structure creating either a ghost image or a reduction in contrast. The lost light reduces contrast at the bottom center of the screen area (and possibly everywhere depending on where the mirrors are with respect to the screen). However, when using different zones, it is possible to select the fresnel characteristics to vary vertically along the screen and thereby provide improved results. While two zones were selected above, additional zones can be used, including transition zones as discussed below with regard to FIG. 11.

Figure 11:
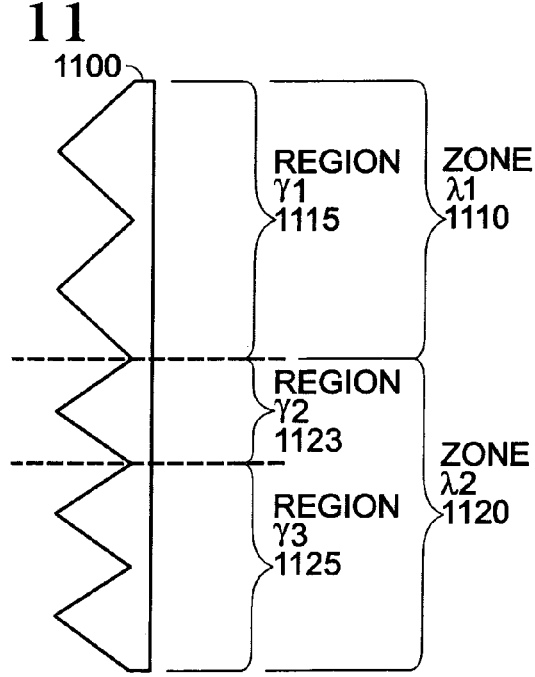
FIG. 11 illustrates a profile cross-section view of a fresnel screen design having two zones with different groove angles and transition regions for the zones.

FIG. 11 illustrates a profile cross-sectional view of a fresnel screen design having two zones with different groove angles and transition regions for the zones. Lens 1100 is illustrated with only a small number of grooves, zones and regions. This is for simplicity of description. A fresnel screen can be used that has any number of grooves, zones, and/or regions.

As used herein, one example of a "zone" is an area of a fresnel screen having a particular groove angle (when the groove angle is not continuously variable) although other types of zones can be used, as described below. An example of a "region" is an area of a fresnel screen in which the face angle ($\gamma$) is defined by a single equation although other types of regions can be used. Also note that a zone can include multiple regions. In one embodiment, one or more transition regions are included at zone boundaries in order to provide a smooth zone transition. As shown in FIG. 11, a first region 1115 has groove angle $\gamma 1$, a second region with groove angle $\gamma 2$, and a third region with groove angle $\gamma 3$, with the third region at the bottom of the screen, and the first at the top of the screen 1100. In this case, a first zone 1110 includes region 1115, and a second zone 1120 includes regions 1123 and 1125.

In one embodiment, the equation, F, that defines the face angle, which can be a function of radius, r, for a first region and the equation, G, that defines the face angle for a second region are equal at the region boundary. In other words, $F(r_1)=G(r_1)$ where $r_1$ is the region boundary. Further, the first derivative of the equation that defines the face angle for a region is equal to the first derivative of equation that defines the face angle at the region boundary. In other words, $F'(r_1)=G'(r_1)$ where $r_1$ is the region boundary.

In one embodiment, the following equations are used to determine the angles to be used for various regions. For a fixed peak angle (peak angle $k=\gamma+\delta$), the face angle can be calculated to create a fresnel screen with no ghost rays near the bottom center and the face angles are modified to increase throughput.

For a two region embodiment, the inner region can be a lossless system defined by:

$$F(R, \gamma) := \left[ \frac{\tan(\gamma) \cdot (\tan(\gamma) + 2 \cdot \tan(k - \gamma)) + \tan\left(\frac{\pi}{2} - \gamma - a\sin\left(\frac{\cos\left(a\tan\left(\frac{R}{fl}\right) + \gamma\right)}{n}\right)\right) \cdot \tan(k - \gamma)}{\tan\left(\frac{\pi}{2} - \gamma - a\sin\left(\frac{\cos\left(a\tan\left(\frac{R}{fl}\right) + \gamma\right)}{n}\right)\right) - \tan(k - \gamma)} - \frac{R}{fl} \right]$$

where n is the refractive index of the fresnel screen material, k is the groove angle, R is the radius from the center of the fresnel screen, and fl is the focal length of the fresnel screen. Outer regions are defined by:

$$F2(R, \gamma) := \frac{\pi}{2} - \gamma - a\sin\left(\frac{\cos\left(a\tan\left(\frac{R}{fl}\right) + \gamma\right)}{n}\right) - 2(k - \gamma) - \theta 2$$

Figure 12:
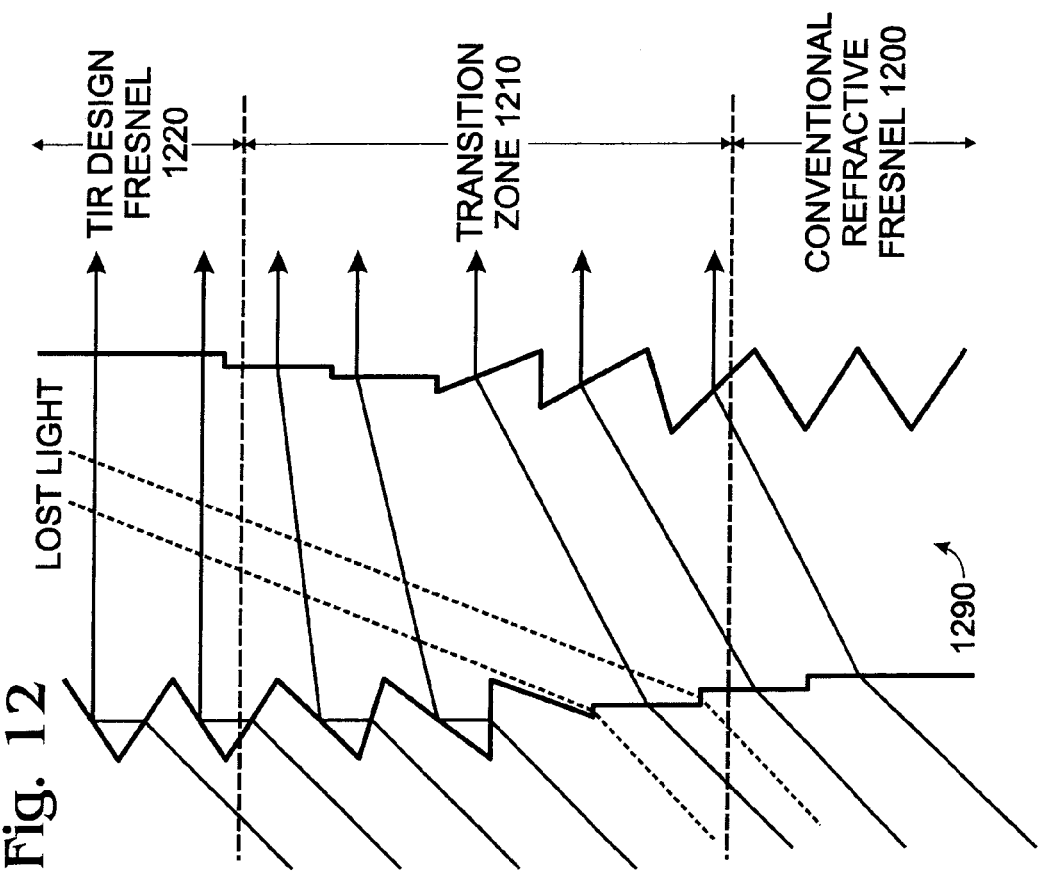
FIG. 12 illustrates an embodiment of a fresnel screen having two zones on opposite sides of the lens with a transition region for the two zones.

FIG. 12 illustrates one embodiment of a fresnel screen having two zones on opposite sides of the lens with a transition region for the two zones. Fresnel screen 1290 includes two zones: a refractive zone, a reflective zone, and a transition region. In alternate embodiments, lens 1290 can have one or more zones on a single side.

In one embodiment, fresnel screen 1290 includes an inner zone that is a conventional refractive fresnel screen design 1200. The inner zone includes the center of lens 1290 extending outward until the outer zone becomes more efficient than the inner zone. Fresnel screen 1290 further includes an outer zone that is a total internal reflection Fresnel design 1220. The outer zone directs more light toward the viewer than if the refractive design of the inner zone were to extend to the edge of the lens.

In order to reduce, or even eliminate, discontinuities between the refractive and the reflective portions of lens 1290, transition region 1210 can be optionally included. In one embodiment, in transition region 1210, the light rays internal to fresnel screen 1290 change gradually from the upward angle of the refractive design to the horizontal angle of the reflective design. The gradual change reduces image discontinuities due to overlapping rays.

Another alternate embodiment of a variable fresnel screen is now described. As mentioned above, pitch and the depth of a fresnel screen can be related. However, the loss of light caused by input light missing a reflection face can be independent of the pitch and the depth for the example shown in FIG. 9.

Figure 13:
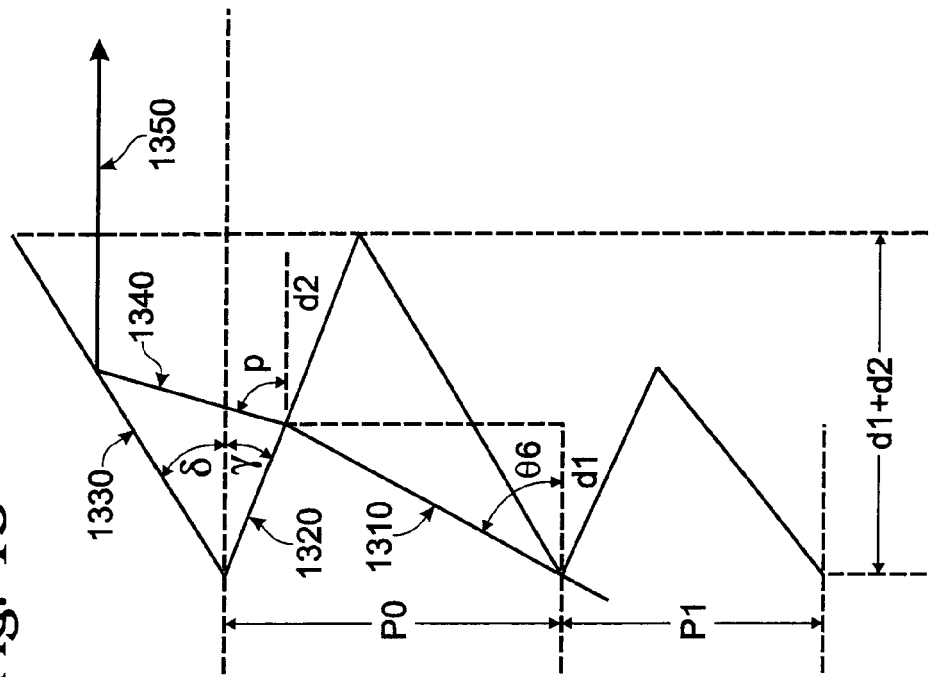
FIG. 13 illustrates a constant thickness, variable pitch, variable depth fresnel screens.
Figure 14:
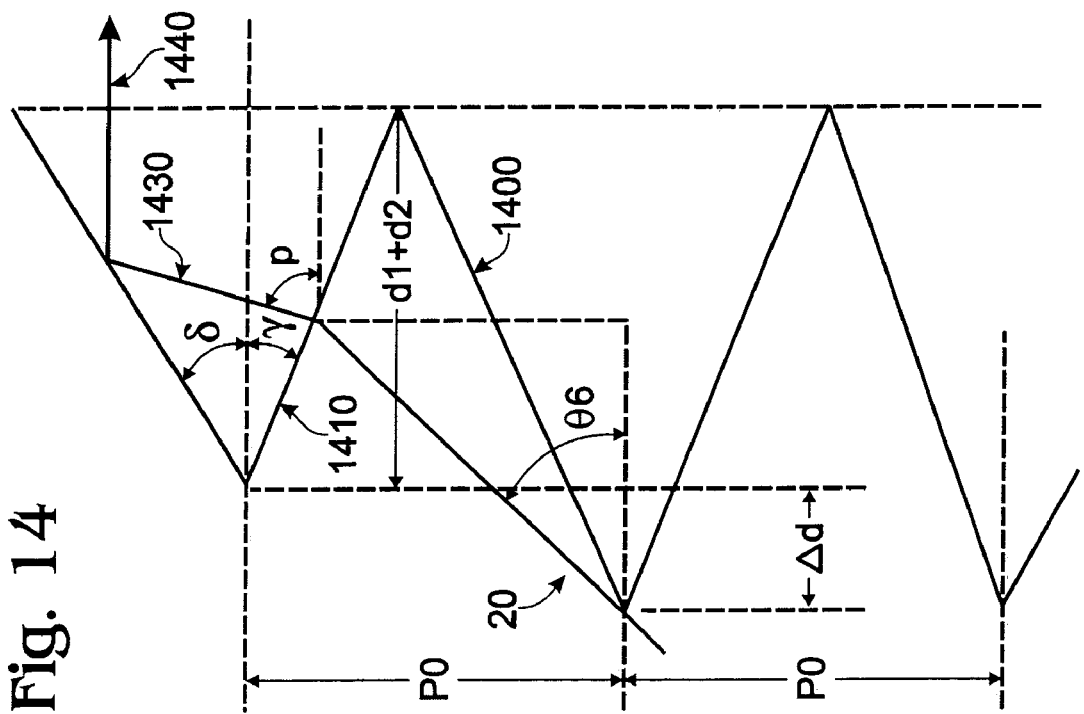
FIG. 14 illustrates a constant pitch, variable thickness, variable depth fresnel screens.

Consequently, pitch and depth can be used as variables (separately or together) to extend a reflection face of a fresnel screen and thereby reduce input light missing a reflective face. In particular, a reflection face of a fresnel screen can be extended by decreasing the pitch of the fresnel screen and/or increasing the depth of the fresnel screen as shown in FIGS. 13 and 14. This allows refracted light from light input at various angles to hit a reflection face and be directed towards a viewer, thereby reducing the amount of light that is not reflected and thus lost.

FIG. 13 illustrates a cross-sectional view of a variable pitch fresnel screen. In this example, the pitch is variable in one zone of the fresnel screen, while another zone or zones of the fresnel screen have a different pitch or pitches. As used with regard to FIG. 13, a "zone" is an area that has a particular pitch or an area with a changing pitch, or a constant pitch.

In one embodiment, the following equation is used to determine the pitch P1 of a fresnel screen from one groove to the next:

$$P1 = \frac{Po(\tan\gamma + \tan\theta 6)(\tan\rho - \tan\delta)}{(\tan\gamma + \tan\delta)(\tan\gamma + \tan\rho)} \quad (1)$$

where Po is the original pitch of the fresnel screen, θ6 is the input angle, or the angle of input ray 1310 from horizontal; γ is the face angle, or the angle of refraction face 1320 from horizontal; δ is the reflection face angle, or the angle of reflection face 1330 (in one example a TIR surface) from horizontal; and ρ is the refracted ray angle, or the angle of refracted ray 1340 from horizontal. The thickness of the screen (d1+d2) can be found from equation (2).

$$\frac{d1 + d2}{P1} = \frac{2(\tan\gamma)}{(\tan\gamma + \tan\theta 6)(\tan\gamma - \tan\delta)} \quad (2)$$

With a pitch of P1, the reflection face of the fresnel screen having a fixed thickness and variable depth is extended sufficiently to reduce the amount of light lost caused by a failure of input light to reflect off of the reflection face. Note however, that the thickness does not have to be constant over the entire lens. Also, the depth and pitch do not have to vary across the entire screen. As such, the fresnel screen may have different surfaces configured to allow light rays of a variety of input angles (from a source unit directed at the screen) to impinge on the screen and impinge on the totally internally reflective surface.

Note also that, in this example, the groove angle in FIG. 13 is shown as substantially constant, even though the pitch is variable. Alternatively, the groove angle(s) can vary.

Thus, in this embodiment, it is possible to vary characteristics of a fresnel screen to reduce lost light, and thus reduce any darkness in the bottom center (or other areas) of the screen. As such, the fresnel screen illustrated in FIG. 13 is configured to vary the pitch and depth of the fresnel grooves to reduce lost input light missing a TIR surface.

Figure 13B:
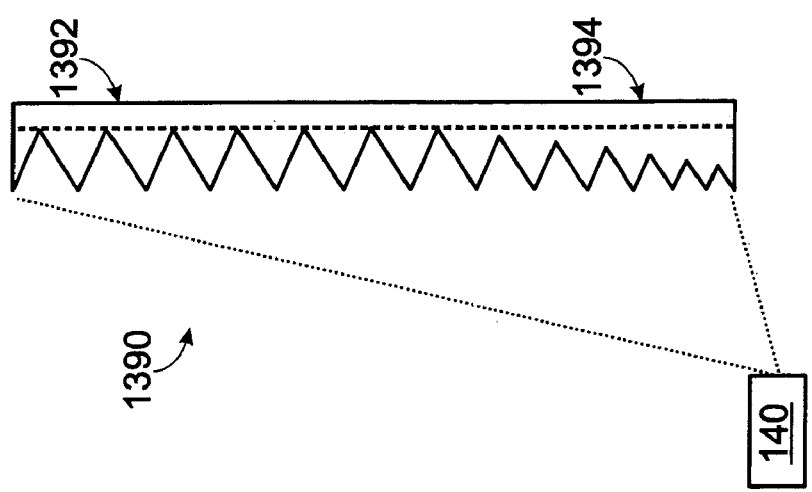
FIG. 13b shows a representation of a fresnel screen in combination with a lens system.
Figure 13A:
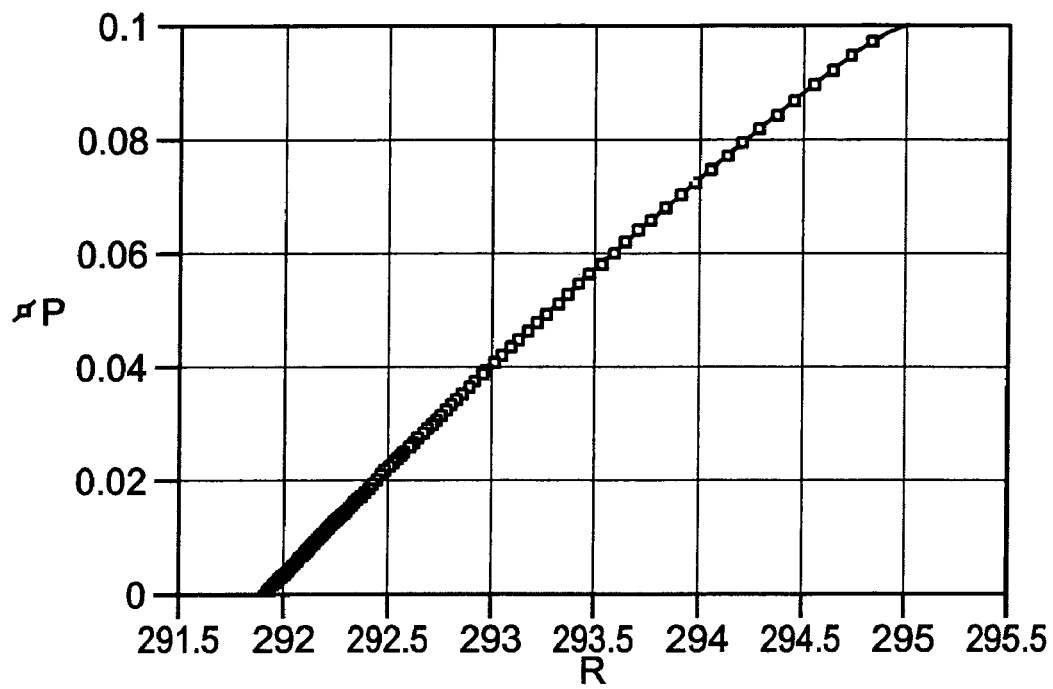
FIG. 13a shows a graph of how fresnel pitch can vary with radius.

FIG. 13*a* shows a graph illustrating fresnel pitch as a function of the radius (r) of the groove for an initial pitch of 0.1 mm. Since the radius (r) can also be correlated with input angle □6, the variation in pitch (and depth) can also be selected to vary as a function of input angle. For this particular example, the pitch is configured reduce to zero (or substantially zero) rapidly to reduce lost light due to missing the TIR surface. Alternatively, in some cases, this rapid reduction is lessened, so that the angle is reduced to substantially zero over approximately 50 to 100 mm for a 10 degree input angle.

FIG. 13*b* shows an example system configuration utilizing fresnel screen 1390 having a first zone 1392 with a constant pitch, constant depth groove, and a second zone 1394 with a variable pitch, variable depth, groove. Also, in zone 1394, the pitch continually decreases toward the bottom of the screen, and the depth continually decreases toward the bottom of the screen. Note however, that this is just one example. In an alternative embodiment, zone 1394 can be at the upper portion of screen 1390 and zone 1392 at the bottom. Still other modifications are possible depending on the lens system and the configuration and/or orientation of, for example, wide angle lens system 140 and screen 1390.

FIG. 14 illustrates a cross-sectional view of a variable thickness fresnel screen. The thickness is variable in that one zone of the fresnel screen has one thickness, while another zone or zones of the fresnel screen have a different thickness. As used with regard to FIG. 14, a "zone" is an area that has a particular thickness, or an area with a changing thickness, or a constant thickness.

In one embodiment, the following equation is used to determine the amount Δd by which to increase the thickness of a fresnel screen from one groove to the next.

$$\Delta d = \frac{Po}{(\tan\gamma + \tan\delta)} - \frac{Po(\tan\gamma + \tan\rho)}{(\tan\gamma + \tan\theta 6)(\tan\rho - \tan\delta)}, \quad (2)$$

where θ6, γ, δ and ρ are defines as described above in FIG. 13.

Increasing the thickness of the fresnel screen in a first zone by an amount Δd to provide the thickness in a second zone, increases the thickness in the second zone by an amount sufficient to extend the reflective face in the second zone and reduce the amount of light lost due to a failure of input light to reflect off of the reflection face.

Again, an alternate embodiment for varying characteristics of a fresnel screen to reduce lost light, and thus reduce any darkness in the screen, has been described. Here, the angles are shown as variable to maintain constant pitch.

Figure 14A:
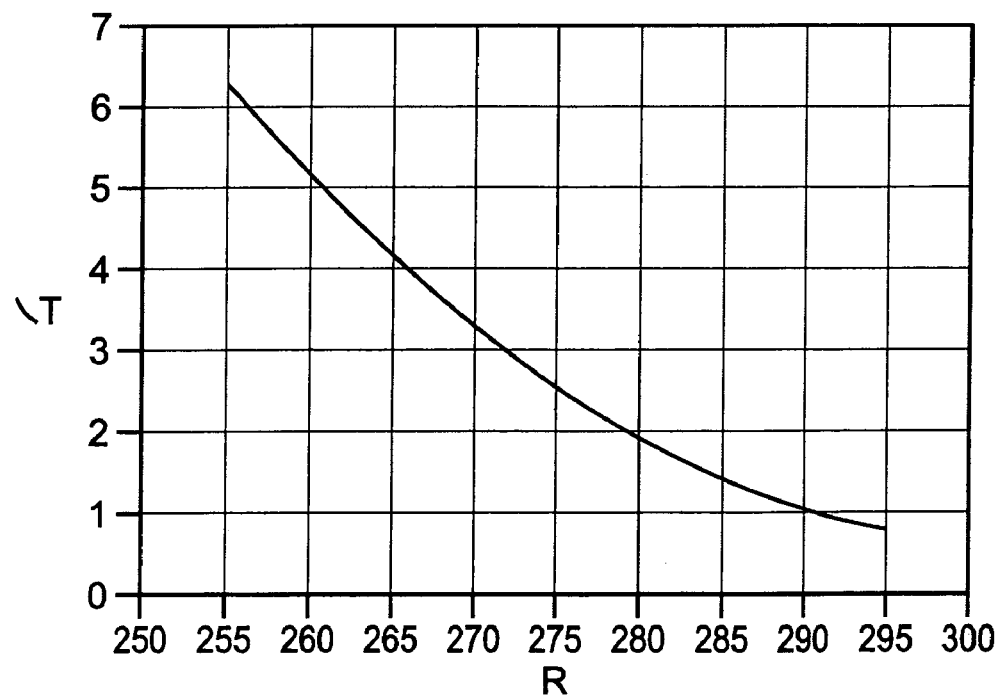
FIG. 14a shows a graph of how fresnel thickness can vary with radius.

FIG. 14*a* shows a graph illustrating thickness (T) as a function of fresnel radius for reduced lost light for a pitch of 0.1 mm.

Note that a fresnel screen can be used in which some regions have characteristics of that shown in FIG. 13, and other regions have characteristics of that shown in FIG. 14.

Further the fresnel screen can be constructed of various materials, such as various polymers.

Although the present disclosure includes specific embodiments, specific embodiments are not to be considered in a limiting sense, because numerous variations are possible. For example, the above projection units can be used with a rear projection television, but can also be used with projection devices coupled to personal computers used to project images onto a wall for viewing during a meeting. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The specification and drawings are, accordingly, to be regarded in an illustrative rather than a restrictive sense.

What is claimed is:

1. A rear projection display device, comprising:
    a source creating light rays;
    a wide angle lens system receiving the light rays, the lens system configured to increase distortion of the light rays in a first stage and decrease distortion in a second stage; and
    a screen having a reflective surface, the screen configured to receive light rays from the wide angle lens system, wherein the screen includes a plurality of grooves, each groove at least partially defined by a groove parameter, and wherein a groove parameter of at least one of the plurality of grooves is different than a groove parameter of at least one other of the plurality of grooves, so as to reduce light rays impinging the screen without impinging on the reflective surface of the screen.

2. The rear projection display device of claim 1 wherein the wide angle lens system projects light rays to the screen at a variety of angles.

3. The rear projection display device of claim 1 further comprising a pair of parallel mirrors for directing light from the lens system to the screen.

4. The rear projection display device of claim 3 wherein the mirrors are substantially parallel with the screen.

5. The rear projection display device of claim 3 wherein the source is offset from an axis of the wide angle lens system.

6. The rear projection display device of claim 1 wherein the screen is comprised of a polymer.

7. The rear projection display device of claim 1 wherein grooves of the screen are circular.

8. The rear projection display device of claim 7 wherein the grooves form a rainbow pattern.

9. The rear projection display device of claim 1 wherein the screen has a variable groove pitch.

10. The rear projection display device of claim 1 wherein the screen has a variable groove depth.

11. The rear projection display device of claim 1 wherein the screen has a variable groove depth, variable groove pitch, and substantially constant screen thickness.

12. The rear projection display device of claim 1 wherein the screen has a variable screen thickness.

13. The rear projection display device of claim 1 wherein the screen has a variable screen thickness, variable groove depth, and substantially constant pitch.

14. A rear-projection display system, comprising:
    a light source projecting light for an image, the light source being on a first optical axis;
    a first lens system parallel to the first optical axis of the light source, configured to introduce distortion in the image;
    a second lens system, on a second optical axis substantially parallel to the first optical axis, configured to remove at least some of the introduced distortion from the image; and
    a screen having grooves on at least a portion of at least one side, the screen receiving the image, the screen having a reflection face in a first zone and an extended reflection face in a second zone, wherein the light arrives at an input surface of the screen at a variety of input angles.

15. The system of claim 14 wherein the first lens system includes a relay lens system having at least one curved lens.

16. The system of claim 14 wherein the first lens system is offset from the first optical axis.

17. The system of claim 14 wherein the second lens system includes at least one curved wide angle lens.

18. The system of claim 14 wherein the screen receives the image from the planar mirrors.

19. The system of claim 15 wherein the screen receives the image on the at least one side with the grooves.

20. The system of claim 15 wherein the reflection face in the first zone and the extended reflection face in the second zone are configured so that the light misses the reflection face and hits the extended reflection face.

21. The system of claim 15 further comprising a totally internally reflective surface on at least one side of the first and second slopes, wherein the pitch and depth of the first and second zone are selected so that substantially no light rays from a projection unit impinging on the lens without impinging on the totally internally reflective surface.

22. The system of claim 18 wherein the screen is positioned substantially parallel to the first and second mirrors.

23. A rear-projection display system, comprising:
    a light source, to project light for an image; and
    a fresnel screen having an internal reflection face in a first zone and an extended internal reflection face in a second zone, wherein the light arrives at an input surface of the fresnel screen at an input angle that causes the light to miss the reflection face and hit the extended internal reflection face, and wherein the light reflects off the extended internal reflection face and exits an output surface of the fresnel screen.

24. The rear-projection display system of claim 23, wherein the second zone comprises a variable pitch based, at least in part, on a constant pitch of the first zone, wherein the variable pitch results in the extended reflective face.

25. The rear-projection display system of claim 23, wherein the second zone comprises a variable thickness based, at least in part, on a constant thickness of the first zone, wherein the variable thickness results in the extended reflective face.

26. A rear projection display device, comprising:
  source means for creating light rays;
  lens system means for receiving the light rays, the lens system further for increasing distortion of the light rays in a first stage and decreasing distortion in a second stage; and
  screen means for receiving light rays from the wide angle lens system and for reducing light rays impinging the screen at a variety of input angles without impinging on the reflective surface of the screen.

27. The device of claim 26 wherein the source means includes at least one of a microelectromechanical system, a grating light valve, a liquid crystal display, and liquid crystal on silicon.

28. The device of claim 26 wherein the lens system means includes at least one of a wide angle lens, a relay lens, and a prism.

29. The device of claim 26 wherein the screen means includes a fresnel screen with a variable pitch and variable depth groove.

30. The device of claim 26 wherein the screen means includes a fresnel screen with a variable depth groove and a variable thickness.

31. The device of claim 26 wherein the screen means includes a fresnel screen with a first zone having a first characteristic, and a second zone with a second characteristic different from the first characteristic.

32. A rear-projection display system, comprising:
  a light source projecting light for an image, the light source being on a first optical axis;
  a first lens system parallel to the first optical axis of the light source, configured to introduce distortion in the image;
  a second lens system, on a second optical axis different from the first optical axis, configured to remove at least some of the introduced distortion from the image; and
  a screen having grooves on at least a portion of at least one side, the screen receiving the image, the screen having a reflection face in a first zone and an extended reflection face in a second zone, wherein the light arrives at an input surface of the screen at a variety of input angles.

33. The system of claim 32 wherein the first lens system includes a relay lens system having at least one curved lens.

34. The system of claim 32 wherein the first lens system is offset from the first optical axis.

35. The system of claim 32 wherein the second lens system includes at least one curved wide angle lens.

36. The system of claim 32 wherein the second axis is substantially perpendicular to the first axis.

37. The system of claim 32 further comprising first and second parallel planar mirrors, the first and second mirrors substantially perpendicular to the second axis and substantially parallel to the first axis.

38. The system of claim 33 wherein the screen receives the image on the at least one side with the grooves.

39. The system of claim 33 wherein the reflection face in the first zone and the extended reflection face in the second zone are configured so that the light misses the reflection face and hits the extended reflection face.

40. The system of claim 33 further comprising a totally internally reflective surface on at least one side of the first and second slopes, wherein the pitch and depth of the first and second zone are selected so that substantially no light rays from a projection unit impinging on the lens without impinging on the totally internally reflective surface.

41. The system of claim 37 wherein the screen receives the image from the planar mirrors.

42. The system of claim 41 wherein the screen is positioned substantially parallel to the first and second mirrors.

* * * * *